(12) United States Patent
Drazic et al.

(10) Patent No.: US 10,887,576 B2
(45) Date of Patent: Jan. 5, 2021

(54) LIGHT FIELD DATA REPRESENTATION

(71) Applicant: INTERDIGITAL VC HOLDINGS, INC., Wilmington, DE (US)

(72) Inventors: Valter Drazic, Betton (FR); Guillaume Boisson, Pleumeleuc (FR); Mozhdeh Seifi, Thorigne-Fouillard (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 133 days.

(21) Appl. No.: 15/761,095

(22) PCT Filed: Sep. 16, 2016

(86) PCT No.: PCT/EP2016/072043
§ 371 (c)(1),
(2) Date: Mar. 17, 2018

(87) PCT Pub. No.: WO2017/046372
PCT Pub. Date: Mar. 23, 2017

(65) Prior Publication Data
US 2019/0174115 A1 Jun. 6, 2019

(30) Foreign Application Priority Data

Sep. 17, 2015 (EP) ..................... 15306434
Sep. 17, 2015 (EP) ..................... 15306436

(51) Int. Cl.
*H04N 13/178* (2018.01)
*G06T 5/50* (2006.01)
(Continued)

(52) U.S. Cl.
CPC ............. *H04N 13/178* (2018.05); *G06T 5/50* (2013.01); *G06T 7/557* (2017.01); *G06T 7/60* (2013.01);
(Continued)

(58) Field of Classification Search
CPC ............... G06T 11/206; G06T 2200/21; G06T 2207/10052; G06T 5/50; G06T 7/557;
(Continued)

(56) References Cited

U.S. PATENT DOCUMENTS 6,097,394 A 8/2000 Levoy et al.
7,187,393 B1 3/2007 Tokimoto et al.
(Continued)

FOREIGN PATENT DOCUMENTS

CN 103402108 11/2013
JP 2000322576 11/2000
RU 2249257 C2 3/2005

OTHER PUBLICATIONS

Georgiev etal., "The Radon Image as Plenoptic Function", 2014 IEEE International Conference on Image Processing (ICIP), Paris, France, Oct. 27, 2014, pp. 1922-1926.
(Continued)

*Primary Examiner* — Francis Geroleo
(74) *Attorney, Agent, or Firm* — Robert D. Shedd

(57) ABSTRACT

A method for reducing the parameters defining an acquired light field ray which enables only the colour associated with the light field ray to be stored instead of 4 light field co-ordinates (x,y,i,j) and its associated colour.

22 Claims, 20 Drawing Sheets

(51) Int. Cl.
    *G06T 7/557*     (2017.01)
    *H04N 13/15*     (2018.01)
    *H04N 5/225*     (2006.01)
    *G06T 7/60*     (2017.01)
    *G06T 11/20*     (2006.01)

(52) U.S. Cl.
    CPC ....... *G06T 11/206* (2013.01); *H04N 5/22541* (2018.08); *H04N 13/15* (2018.05); *G06T 2200/21* (2013.01); *G06T 2207/10052* (2013.01)

(58) Field of Classification Search
    CPC ........ G06T 7/60; H04N 13/15; H04N 13/178; H04N 5/22541
    See application file for complete search history.

(56) References Cited

U.S. PATENT DOCUMENTS

| | | | |
|---|---|---|---|
| 7,643,675 | B2 | 1/2010 | Evans et al. |
| 8,237,708 | B2 | 8/2012 | Mantzel |
| 8,619,177 | B2 | 12/2013 | Perwass et al. |
| 2004/0114807 | A1* | 6/2004 | Lelescu ............ G06T 9/00 382/229 |
| 2007/0133888 | A1* | 6/2007 | Lelescu ............ G06T 9/00 382/232 |
| 2009/0232129 | A1 | 9/2009 | Wong et al. |
| 2011/0032337 | A1 | 2/2011 | Rodriguez Ramos et al. |
| 2013/0002827 | A1 | 1/2013 | Lee et al. |
| 2013/0113981 | A1 | 5/2013 | Knight et al. |
| 2014/0204111 | A1 | 7/2014 | Vaidyanathan et al. |
| 2014/0240532 | A1 | 8/2014 | Marwah et al. |
| 2014/0328535 | A1 | 11/2014 | Sorkine-Hornung |
| 2015/0177062 | A1* | 6/2015 | Nishiyama ......... G01J 1/4228 702/150 |

OTHER PUBLICATIONS

Yamashita et al., "Compressive Acquisition of Ray-Space Using Radon Transform", IS&T/SPIE Electronic Imaging Conference, San Jose, California, USA, Feb. 18, 2009, pp. 1-10.
Stewart et al., "A New Reconstruction Filter for Undersampled Light Fields", 14th Eurographics Symposium on Rendering 2003, Leuven, Belgium, Jun. 25, 2003, pp. 1-8.
Levoy, M., "Efficient Ray Tracing of Volume Data", ACM Transactions on Graphics, vol. 9, No. 3, Jul. 1990, pp. 245-261.
Parker et al., "Interactive Ray Tracing for Volume Visualization", IEEE Transactions on Computer Graphics and Visualization, vol. 5, No. 3, Jul.-Sep. 1999, pp. 238-250.
Garg et al., "Symmetric Photography: Exploiting Data-sparseness in Reflectance Fields", 17th Eurographics Symposium on Rendering 2006, Nicosia, Cyprus, Jun. 26, 2006, pp. 1-12.
Gortler et al., "The Lumigraph", ACM 23rd Annual Conference on Computer Graphics and Interactive Techniques, SIGGRAPH'96, New Orleans, Louisiana, USA, Aug. 4, 1996, pp. 43-52.
Gotz et al., "A Fast Digital Radon Transform—An Efficient Means for Evaluating the Hough Transform", Journal Pattern Recognition, vol. 28, No. 12, Dec. 1995, pp. 1985-1992.
Press, W., "Discrete Radon transform has an exact, fast inverse and generalizes to operations other than sums along lines", Proceedings of the National Academy of Sciences, vol. 103, No. 51, Dec. 19, 2006, pp. 19249-19254.
Anonymous, "Light Field File Formate", http://graphics.stanford.edu/software/lightpack/doc/file_format.html, May 1, 2018, pp. 1-4.
Flanagan, C., "The Bresenham Line-Drawing Algorithm", http://www.cs.helsinki.fi/group/goa/mallinnus/lines/bresenh.html, Jan. 20, 2016, pp. 1-7.
Anonymous, "The Pinhole Camera", http://www.ics.uci.edu/~majumder/vispercep/cameracalib.pdf, Jul. 2015, pp. 1-6.
Georgiev et al., "Lytro camera technology: theory, algorithms, performance analysis", Proceedings of SPIE, 8667, vol. Feb. 26, 2013, pp. 1-10.

* cited by examiner

LIGHT FIELD DATA REPRESENTATION

This application claims the benefit of International Application PCT/EP2016/072043, under 35 U.S.C. § 365, filed on Sep. 16, 2016, which was published in accordance with Article 21(2) on Mar. 23, 2017, in English, and which claims the benefit of European Patent Application No. 15306436.5, filed on Sep. 17, 2015 and European Patent Application No. 15306434.0, filed on Sep. 17, 2015.

TECHNICAL FIELD

The present invention relates to generation of data representing a light field. An aspect of the invention relates to the provision and processing of light field metadata.

BACKGROUND

Conventional cameras capture light from a three-dimensional scene on a two-dimensional sensor device sensitive to visible light. Light sensitive technology used in such imaging devices is often based on semiconductor technology, capable of converting photons into electrons such as, for example, charge coupled devices (CCD) or complementary metal oxide technology (CMOS). A digital image photosensor, for example, typically includes an array of photosensitive cells, each cell being configured to capture incoming light. A 2D image providing spatial information is obtained from a measurement of the total amount of light captured by each photosensitive cell of the image sensor device. While the 2D image can provide information on the intensity of the light and the colour of the light at spatial points of the photosensor(s), no information is provided on the direction of the incoming light.

Light field cameras (also known as radiance capturing cameras) can provide directional information on incoming light rays in additional to 2D spatial information. The directional information may be obtained by the use of an array of micro-lenses, often referred to as a microlens array (MLA) associated with an image sensor. A light field array camera, for example, is provided with a microlens array and a photosensor. Light field cameras include plenoptic cameras, camera arrays and distributed cameras. A plenoptic camera is provided with a main lens focusing light on a MLA, and a photosensor associated with the MLA. In other configurations of light field cameras a plurality of cameras each provided with its own lens and sensor may be used to obtain light field data.

A light field is often defined as a 4D function characterizing the light from different directions at different points in a scene. The information on the directional distribution of the light rays is typically referred to as light field data or 4D data. Since the information provides 4 parameters—two dimensional positional information and two dimensional angular information the directional distribution corresponds to a four-dimensional (4D) function. The light field may be interpreted as a two dimensional collection of 2D images of a scene.

The light field data obtained can be processed for many applications, for example, to generate refocused images of the scene, to generate images from different viewpoints, to provide depth information on the captured scene or to generate 30 images.

Light field data can take up large amounts of storage space which can make storage cumbersome and processing less efficent. In addition light field acquisition devices are extremely heterogeneous. Light field cameras are of different types for example plenoptic or camera arrays. Within each type there are many differences such as different optical arrangements, or micro-lenses of different focal lengths. Each camera has its own proprietary file format. At present here is no standard supporting the acquisition and transmission of multi-dimensional information for an exhaustive over-view of the different parameters upon which a light-field depends. As such acquired light field data for different cameras have a diversity of formats The present invention has been devised with the foregoing in mind.

SUMMARY OF INVENTION

Embodiments of the invention set out to provide methods for reducing the parameters defining an acquired light field ray which enables only the colour associated with the light field ray to be stored instead of 4 light field co-ordinates (x,y,i,j) and its associated colour.

According to a first aspect of the invention there is provided a method of generating, tom light field data in the form of pixels captured from a scene, geometrical data defining the path tom the scene of light field rays corresponding to the captured light field data;

obtaining, from the geometrical data, intersection data defining intersections of the light field rays from the scene with a plurality of given reference planes, said reference planes corresponding to different depths in the scene, each set of intersection data corresponding to a light told ray having a colour value;

defining a parameter space of sampling cells for representation of the intersection data determining, for example by discrete radon transformation or from calibration data, one or more digital data hyper-planes in the parameter space representing the intersection data;

providing a data format representative of the light field including data parameters defining the data hyper-planes in the parameter space and the colour value associated with each generated light field ray.

A data hyper plane in a 4D space is a set of points linked together by an equation of type $a.x1+b.x2+c.y1+d.y2+e=0$; For example the equation may define a hyper plane relating light field parameter data as follows/

$$(z_2-z_3)(x_1+y_1)+(z_3-z_1)(x_2+y_2)=(z_2-z_1)(x_3+y_3)$$

Where z1 and z2 define the depths of the reference planes, x1, y1 define the intersection of alight field ray with reference plane 1, x2 and y2 define the intersection of the light field ray with reference plane 1, and x3, y3 and z3 define the intersection of the light field ray with a rendering plane.

In an embodiment, the data parameters defining the data hyper-planes include data representative of at least one of:
minimum value of intersection data of a first reference plane;
minimum value of intersection data of the first reference plane;
minimum value of intersection data of a second reference plane;
maximum value of intersection data of the second reference plane;

In an embodiment, the data parameters defining the data hyper-planes include data representative of at least one of:
the number of sampling cells defining the parameter space;
the position of the first reference plane; and the position of the second reference plane.

In an embodiment, two orthogonal discrete radon transforms are applied in the parameter space to obtain the one or more digital lines.

In an embodiment, each data hyper plane format being defined by a plurality of cells of the parameter space, at least one first cell representative of the interception of the line with an axis and at least one second cell from which the slope of the line may be determined.

In an embodiment, each digital hyper plane is generated by application of Bresenham's algorithm.

In an embodiment, a beam of rays is represented as a plurality of lines having the same slope and different axis interception points.

In an embodiment, the data representative of the acquired light field data comprises data representative of the thickness of the beam based on upper and lower boundaries of the axis interception data of lines of the beam.

In an embodiment, the data representative of the acquired light field data is provided as meta data, the header of meta data comprising the ray diagram parameters defining the graphical representation of the intersection data in a 2D ray diagram and the body of the metadata comprising data representative of colour of the ray.

Another aspect of the invention provides a device for providing metadata for captured light field data,
the device comprising
a light field data acquisition module for acquiring light field data captured by a light field camera and
a light field data generation module configured to
generate, from light field data in the form of pixels captured from a scene, geometrical data defining the path from the scene of light field rays corresponding to the captured light field data;
obtain, from the geometrical data, intersection data defining intersections of the light field rays from the scene with a plurality of given reference planes, said reference planes being parallel to one another and corresponding to different depths in the scene, each set of intersection data corresponding to a light field ray having a colour value;
define a parameter space of sampling cells for representation of the intersection data
determine, by discrete radon transformation, one or more digital data hyper-planes in the parameter space representing the intersection data;
provide a data format representative of the light field including data parameters defining the data hyper-planes in the parameter space and the colour value associated with each generated light field ray.

A further aspect of the invention provides a light field imaging device comprising: an array of micro lenses arranged in a regular lattice structure; a photosensor configured to capture light projected on the photosensor from the array of micro lenses, the photosensor comprising sets of pixels, each set of pixels being optically associated with a respective micro lens of the array of micro lenses; and a device for providing metadata in accordance with any embodiment of the second aspect of the invention.

Another aspect of the invention provides a device for rendering an image from light field data obtained using a method in accordance with any embodiment of the first aspect of the invention.

Another aspect of the invention provides a data package for data representative of rays of a light field comprising
ray diagram parameters defining the graphical representation in a ray diagram of intersection data of the light rays, the intersection data defining intersections of the light field rays from the scene with a plurality of given reference planes, said reference planes corresponding to different depths in the scene; and
colour data defining colours of the light field ray.

The data package may be carried by a signal for example or provided on a non-transient medium.

Another aspect of the invention provides a computer implemented method for generating data representative of alight field, the method comprising:
obtaining intersection data defining intersections of light field rays from the scene with a plurality of given reference planes, said reference planes corresponding to different depths in the scene, each set of intersection data corresponding to a light field ray having a colour value;
determining, one or mom digital data hyper-planes representing the intersection data in a parameter space of sampling cells;
scanning data on or around the data hyper-planes by means of parametric equations to sample data representative of the light field ray
providing a data format representative of the light field including at least one data parameters defining the at least one data hyper plane in the parameter space and the colour value associated with each generated light field ray.

In an embodiment, the one or more digital data hyper-planes are determined by discrete radon transformation.

In an embodiment, two orthogonal discrete radon transforms are applied in the parameter space to obtain the one or more digital hyper planes.

In an embodiment, the one or more data hyper-planes are determined from data defining camera acquisition parameters In an embodiment scanning the data comprises applying the following algorithm:

```
for each i ∈ [0, N – 1] ⊂ N
 for each j ∈ [0, M – 1] ⊂ N
  for each k ∈ [0, K – 1] ⊂ N
   calculate 1 ∈ N
    store RGB value of the ray located in cell i, j, k, l
  end for k
 end for j
end for i
```

A further aspect of the invention relates to a data package for data representative of rays of a light field comprising at least one data parameter defining a hyper-plane in a parameter space, the hyper plane representing intersection data defining intersections of light field rays from the scene with a plurality of given reference planes, said reference planes corresponding to different depths in the scene, each set of intersection data corresponding to a light field ray having a colour value; and the colour value associated with each light field ray.

Another aspect of the invention provides a computer implemented method for generating data representative of a light field comprising acquiring light field data representative of light field rays captured from a scene; obtaining, from the acquired light field data, intersection data defining intersections of the light field rays from the scene with a plurality of given reference planes, said reference planes corresponding to different depths in the scene; and obtaining ray diagram parameters defining the graphical representation of the intersection data in a ray diagram to provide data representative of the acquired light field data.

In an embodiment, the interception data corresponding to the light field rays is graphically represented in the ray diagram as datalines and the ray diagram parameters include data representative of at least one of: the slope of a dataline; and an interception of a dataline with an axis of the ray diagram.

In an embodiment, the datalines are detected in the ray diagram by applying a Radon transform.

In an embodiment, the graphical representation is provided as a matrix of cells to provide a digital dataline, each digital dataline format being defined by a plurality of cells at least one first cell representative of the interception of the line with an axis and at least one second cell from which the slope of the line may be determined.

In an embodiment, each digital dataline is generated by application of Bresenham's algorithm.

In an embodiment, the data representative of the acquired light field data comprises data defining the matrix of cells.

In an embodiment, the data representative of the acquired light field data further comprises colour data representing the colour of the corresponding light field rays.

In an embodiment, the data representative of the acquired light field data comprises data defining the number of cameras used to capture the light field rays.

In an embodiment, a beam of rays is represented as a plurality of lines having the same slope and different axis interception points.

In an embodiment, the data representative of the acquired light field data comprises data representative of the thickness of the beam based on upper and lower boundaries of the axis interception data of lines of the beam.

In an embodiment, the data representative of the acquired light field data is provided as meta data, the header of meta data comprising the ray diagram parameters defining the graphical representation of the intersection data in a ray diagram and the body of the metadata comprising data representative of colour of the ray.

A further aspect provides a for providing metadata for captured light field data, the device comprising alight field data acquisition module for acquiring light field data captured by alight field camera and alight field data generation module configured to obtain, from the acquired light field data, intersection data defining intersections of the light field rays from the scene with a plurality of given reference planes, said reference planes corresponding to different depths In the scene; and obtain ray diagram parameters defining the graphical representation of the intersection data in a ray diagram to provide data representative of the acquired light field data.

Another aspect provides a light field imaging device comprising: an array of micro lenses arranged in a regular lattice structure; a photosensor configured to capture light projected on the photosensor from the array of micro lenses, the photosensor comprising sets of pixels, each set of pixels being optically associated with a respective micro lens of the array of micro lenses; and a device for providing metadata as described above At least part of the method according to embodiments of the invention may be computer implemented. Accordingly, such elements may take the form of an entirely hardware embodiment, an entirely software embodiment (Including firmware, resident software, micro-code, etc.) or an embodiment combining software and hardware aspects that may all generally be referred to herein as a "circuit", "module" or "system'. Furthermore, such elements may take the form of a computer program product embodied In any tangible medium of expression having computer usable program code embodied in the medium.

Since elements of the present invention can be implemented In software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION

Figure 1A:
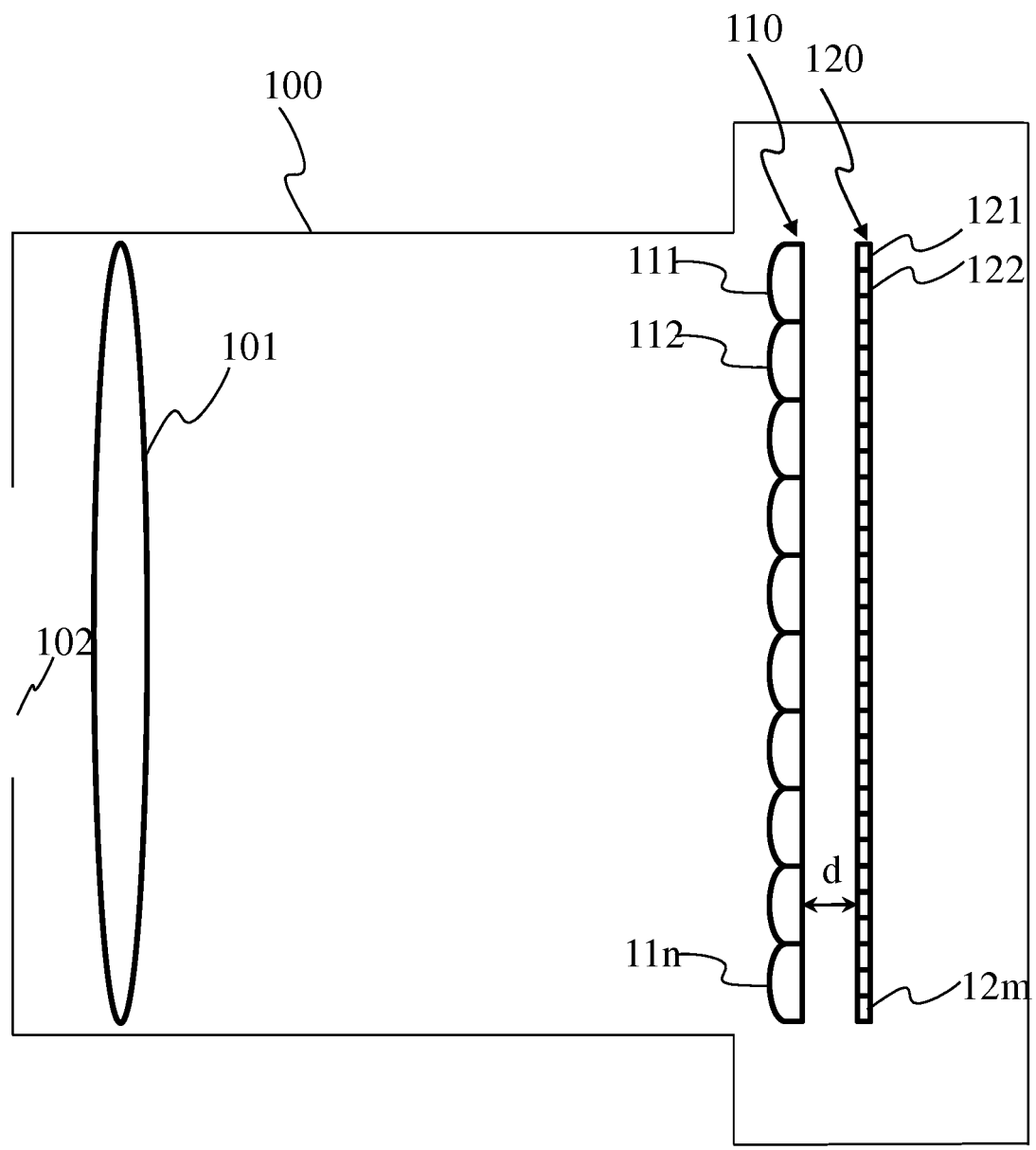
FIG. 1A is a schematic diagram of alight field camera according to a first embodiment of the invention.

Light-field cameras are typically used to record a 4D light-field on a sensor composed of an array of pixels. The 4D light-field data provides 2-dimensional spatial information and 2-dimensional angular information on the incoming light. Such light-Field cameras may be for instance: a plenoptic camera 100 comprising a main lens 101, an array of lenses 110 and a photo sensor 120 as illustrated in FIG. 1A; or a multi-camera array comprising an array of lenses 210 and a photosensor 220 without a main lens, as illustrated in FIG. 18. A multi-array camera may be considered as a particular case of a plenoptic camera where the mains lens has an infinite focal.

Embodiments of the invention provide formatting of light field data for further processing applications such as format conversion, refocusing, viewpoint change and 3D image generation.

FIG. 1A is a schematic diagram of a light field camera for which one or more embodiments of the invention may be applied.

The light field camera 100 of FIG. 1A is a plenoptic type light field camera comprising a micro lens array 110 and an image sensor 120 associated with the micro lens array 110. Further optics may be provided such as an aperture 102 for enabling a selectable amount of light to enter into the light field camera. The lens arrangement further includes a main (objective) lens 101 for focusing light towards the micro lens array 110.

The micro lens array 110 is composed of an array of microlenses 111, 112, 113 . . . 11n arranged, in a regular lattice structure. For example, the structure may be a rectangular lattice of rows and columns. The micro lens array may also be referred to as a lenslet array. For purposes of illustration, the microlens array 110 is shown with a relatively small number of microlenses, but it will be appreciated that the number of microlenses may reach up to several thousand or even several million microlenses.

Optionally, spacers might be placed around each micro lens of the micro-lens array 110 between the micro-lens array 110 and the image sensor 120 in order to prevent light from one micro lens from overlapping with light of other microlenses of the microlens array 110 at the image sensor 120.

The image sensor comprises a photosensor array 120 composed of a number m of photo sensors 121, 122, 123, 124 . . . 12m arranged In a lattice structure. For example the structure may be a rectangular lattice of rows and columns. Each photosensor 121, 122, 123, 124, . . . 1, 2m corresponds to a pixel or a group of pixels of the raw image of the scene captured by the photosensor array 120, each pixel covering a part (also referred to as a point) of the scene. For purposes of illustration, the photosensor array 120 is illustrated as having a relatively small number of photosensors 121 to 121m. It will be appreciated, however, that the number of photosensors is not limited to that illustrated in FIG. 1A but may be extended to any number of photosensors, for example several thousand or several million photosensors. As an illustrative example, an image of 12.4 megapixels may be provided by an array of 4088×3040 pixels/photosensors. The image sensor may be for example a charge coupled device (CCD).

The microlenses 111, 112, 11n of the micro lens array 110 are arranged such that each microlens is optically associated with photosensors of the photo sensor array 120. The photosensor array 120 is generally of finer pitch than the microlens array. Accordingly, each microlens is associated with a plurality of photosensors of the photosensor array 120. Optical association between a microlens and a group of photosensors signifies that the light rays passing through a given microlens reach at least one of the group of photosensors optically associated with the given microlens.

The interposition of the microlens array 110 between the main lens 101 and the photosensor 120 results in multiple images being formed on the photosensor array 120. Each microlens of the microlens array 110 projects a respective image, onto the associated photosensors of the photosensor array 120. Accordingly the raw image captured by the image sensor 120 is composed of an array of small images, as for example illustrated in FIG. 3, typically referred to as micro-images. Each micro-image corresponds to a partial field of view from a respective different viewpoint, and corresponds to a micro-lens of the microlens array. Each pixel of photosensor 120 may be seen as corresponding to a 4D light field coordinate where two dimensions specify its spatial position on the sensor and two dimensions specify the angular or directional information of light that is incident upon that pixel according to the 2D position of the pixel within the microimage which it belongs to.

A color filter array (CFA) may in some cases be arranged on the microlens array 110 or on the photosensor array 120. The CFA typically arranges RGB (Red, Green and Blue) color filters on the photosensor or microlens array, the RGB arrangement taking, for example, the form of a Bayer filter mosaic. One color filter (red, green or blue filter) may be associated with an MIA according to a predetermined pattern comprising 50% green, 25% red and 25% blue in the example of a Bayer filter, such a pattern also being referred to as a RGBG, GRGB or RGGB pattern. It will be appreciated that, the arrangement of the color filters on the microlens array 110 or photosensor array 120 is not limited to a RGGB pattern In other embodiments, the predetermined pattern may be a RGBE pattern with one of the green filters modified to 'Emerald' (for a block of four color filters): a CYYM pattern with one 'Cyan' filter, two 'Yellow' filters and one 'Magenta' filter (for a block of four color filers); a CYGM pattern with one 'Cyan' filter, one 'Yellow' filter, one 'Green' filter and one 'Magenta' filter; a RGBW pattern with one 'Red' filter, one 'Green' filter, one 'Blue' filter and one 'White' filter, several arrangement being possible (for example arranged on a block of four color filters with 'White' for the upper left filter, 'Red' for the upper right filter, 'Blue' for the lower left filter and 'Green' for the lower right filter; or arranged on a block of 4×4 color filters with 'White', 'Blue', 'While', 'Green' for the first line, 'Blue'. 'White' 'Green'. 'White' for the second line below the first line. 'White', 'Green', 'White', 'Red' for the third line below the second line and 'Green', 'While', 'Red', 'White' for the fourth line below the third line).

The gap between the microlens array and the photosensor array may be composed of air, of an optical material having an index n (for example a glass layer) or of multiple layers comprising at least one layer air layer and at least one optical material layer. Using a glass layer to form the gap has the advantages of keeping the microlens array 110 at a constant distance from the photosensor array 120 uniformly across the photosensor array 120 and of reducing this distance when needed. If d is the distance between the output of the microlens array 110 and the photosensor array 120 along a longitudinal axis, having a layer composed of an optical material with an index n (n>1, for example n=1.6) between the micro lens array 110 and the photosensor array 120 enables the distance to be set to din without modifying the distance d. By adapting/modifying the index of the optical material of the layer forming the gap, it is possible to adapt/modify a parameter representative of the distance between the microlens array 110 and the photosensor array 120 without modifying the distance d.

Figure 1B:
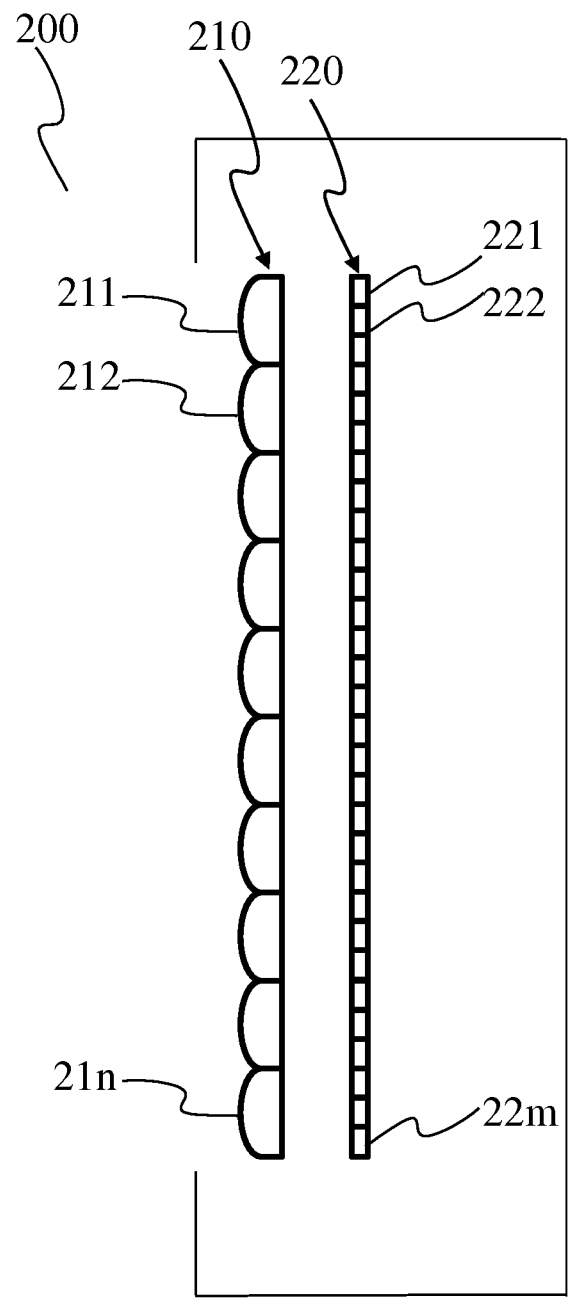
FIG. 1B is a schematic diagram of a light field camera according to a second embodiment of the invention.

FIG. 1B is a schematic diagram of a light field camera according to a second embodiment of the invention.

The light field camera 200 according to the second embodiment of the invention is a multi camera array type light field camera comprising a micro lens array 210 and an image sensor 220 associated with the micro lens array 210. In this embodiment a main lens 201 for focusing light towards the micro lens array 210 is not present. Elements such as the photosensor array 220 and micro lens array 210 operate in a similar manner to the corresponding elements of the plenoptic type camera of FIG. 1A. The main difference is that the main lens is not present in the embodiment of FIG. 18. Each micro-image corresponds to a full field of view from a respective different viewpoint.

Figure 2A:
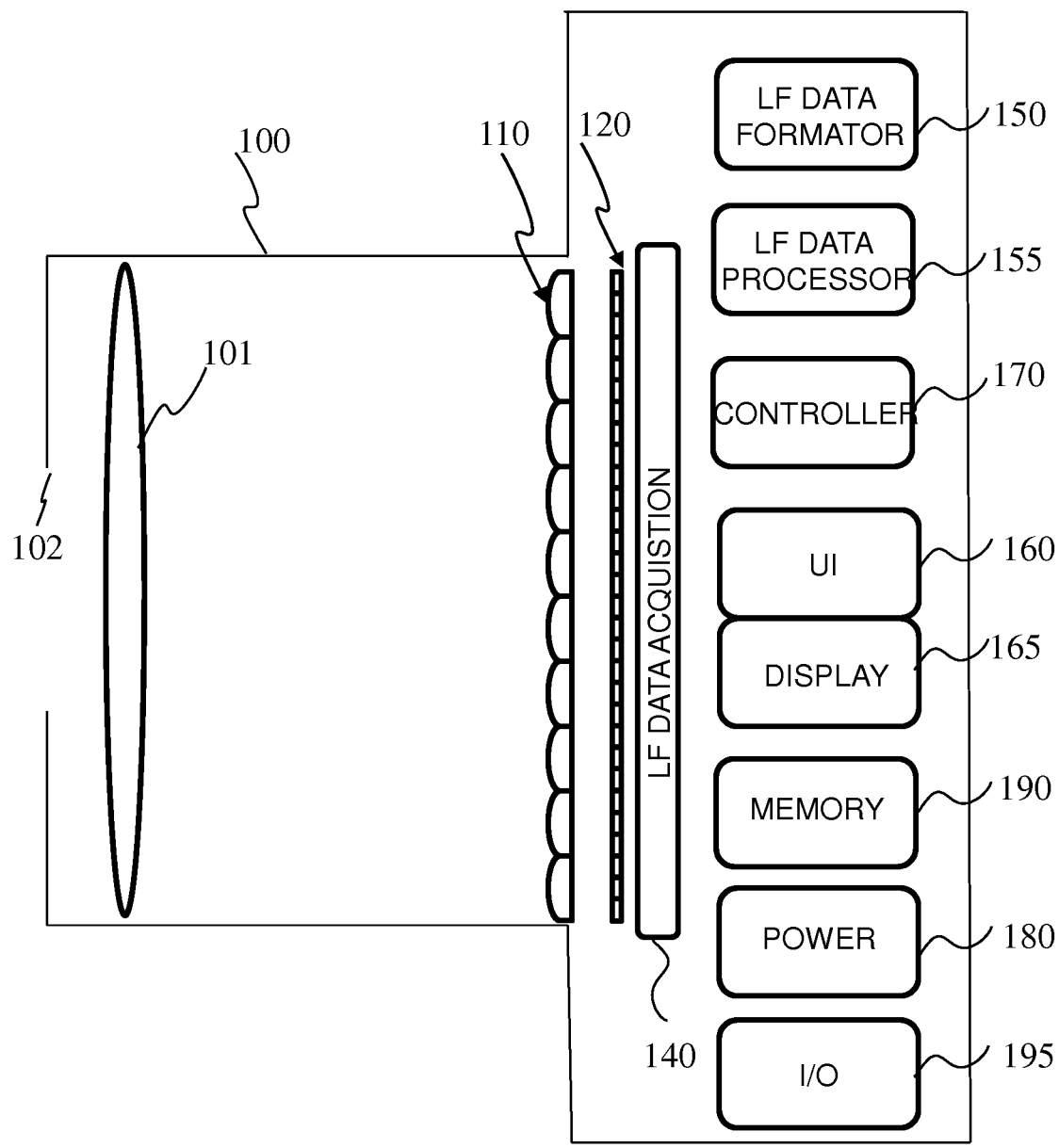
FIG. 2A is a functional diagram of alight field camera according to an embodiment of the invention.

FIG. 2A is a block diagram of a light field camera device in accordance with an embodiment of the invention. The light field camera comprises an aperture/shutter 102, a main (objective) lens 101, a micro lens array 110 and a photosensor array 120 in accordance with the light field camera of FIG. 1A. In some embodiments the light field camera includes a shutter release that is activated to capture a light-field image of a subject or scene. It will be appreciated that the functional features may also be applied to the light field camera of FIG. 18.

The photosensor array 120 provides light field image data which is acquired by LF Data acquisition module 140 for generation of a light field date format by light field data formatting module 150 and/or for processing by light field data processor 186. Light field data may be stored, after acquisition and after processing. In memory 190 in a raw data format, as sub aperture images or focal stacks, or in a light field data format in accordance with embodiments of the invention.

In the illustrated example, the light field data formatting module 150 and the light field data processor 155 are disposed in or integrated into the light field camera 100. In other embodiments of the invention the light field data formatting module 150 and/or the light field data processor 155 may be provided in a separate component external to the light field capture camera. The separate component may be local or remote with respect to the light field image capture device. It will be appreciated that any suitable wired or wireless protocol may be used for transmitting light field image data to the formatting module 150 or light field data processor 155; for example the light field data processor may transfer captured light field image data and/or other data via the Internet, a cellular data network, a WiFi network, a BlueTooth communication protocol, and/or any other suitable means.

The light field data formatting module 150 is configured to generate data representative of the acquired light field, in accordance with embodiments of the invention. The light field data formatting module 150 may be implemented in software, hardware or a combination thereof.

The light field data processor 155 is configured to operate on raw light field image data received directly from the LF data acquisition module 140 for example to generate focal stacks or a matrix of views in accordance with embodiments of the invention. Output data, such as, for example, still images, 2D video streams, and the like of the captured scene may be generated. The light field data processor may be implemented in software, hardware or a combination thereof.

In at least one embodiment, the light field camera 100 may also include a user interface 160 for enabling a user to provide user input to control operation of camera 100 by controller 170. Control of the camera may include one or more of control of optical parameters of the camera such as shutter speed, or in the case of an adjustable light field camera, control of the relative distance between the microlens array and the photosensor, or the relative distance between the objective lens and the microlens array. In some embodiments the relative distances between optical elements of the light field camera may be manually adjusted. Control of the camera may also include control of other light field data acquisition parameters, light field data formatting parameters or light field processing parameters of the camera. The user interface 160 may comprise any suitable user input device(s) such as a touchcreen, buttons, keyboard, pointing device, and/or the like. In this way, input received by the user interface can be used to control and/or configure the LF data formatting module 150 for controlling the data formatting, the LF data processor 155 for controlling the processing of the acquired light field data and controller 170 for controlling the light field camera 100.

The light field camera includes a power source 180, such as one or more replaceable or rechargeable batteries. The light field camera comprises memory 190 for storing captured light-field data and/or rendered final images or other data such as software for implementing methods of embodiments of the invention. The memory can include external and/or internal memory. In at least one embodiment, the memory can be provided at a separate device and/or location from camera 100. In one embodiment, the memory includes a removable/swappable storage device such as a memory stick.

The light field camera may also include a display unit 165 (e.g., an LCD screen) for viewing scenes in front of the camera prior to capture and/or for viewing previously captured and/or rendered images. The screen 165 may also be used to display one or more menus or other information to the user. The light field camera may further include one or more I/O interfaces 195, such as FireWire or Universal Serial Bus (USB) interfaces, or wired or wireless communication interfaces for data communication via the Internet, a cellular data network, a WiFi network, a BlueTooth communication protocol, and/or any other suitable means. The I/O interface 195 may be used for transferring data, such as light field representative data generated by LF data formatting module in accordance with embodiments of the invention and light field data such as raw light field data or data processed by LF data processor 155, to and from external devices such as computer systems or display units, for rendering applications.

Figure 2B:
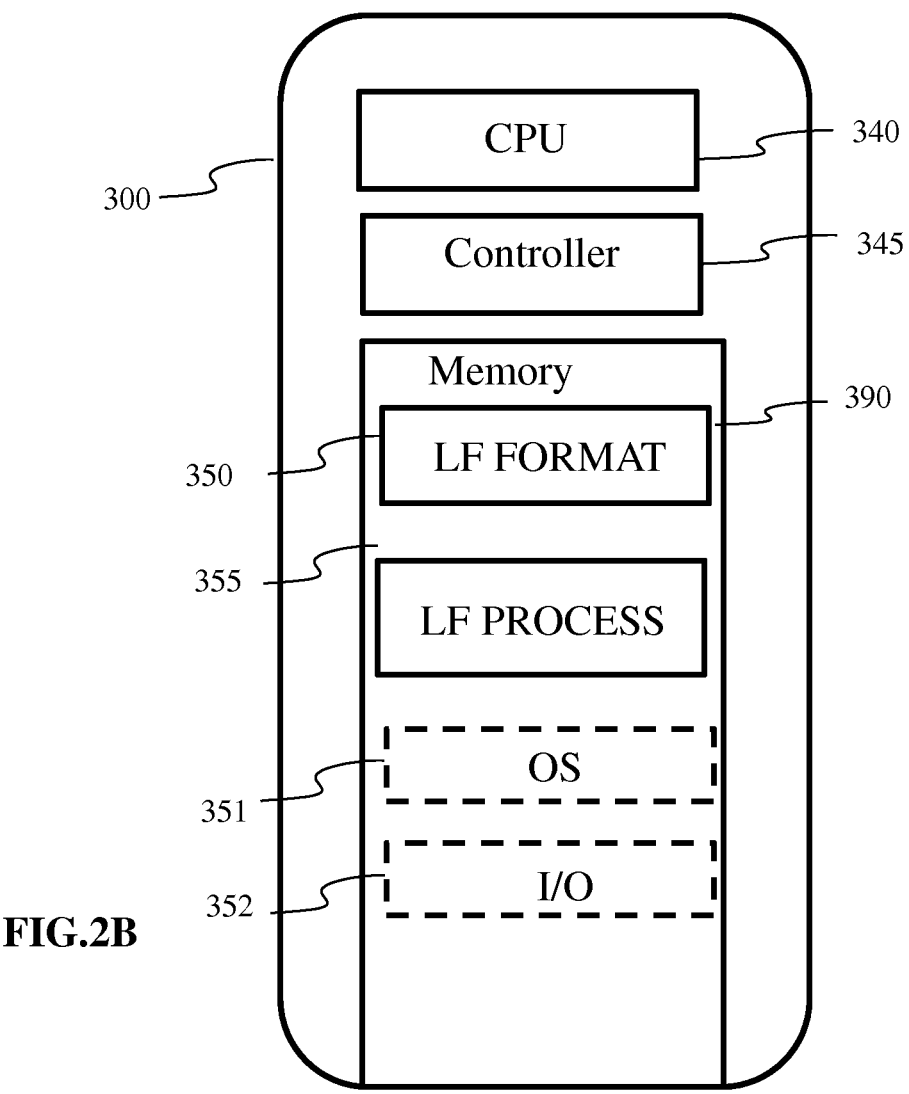
FIG. 2B is a functional diagram of a light field data formator and light field data processor according to an embodiment of the invention.

FIG. 2B is a block diagram illustrating a particular embodiment of a potential implementation of light field data formatting module 150 and the light field data processor 153.

The circuit 300 includes memory 390, a memory controller 345 and processing circuitry 340 comprising one or more processing units (CPU(s)). The one or more processing units 340 are configured to run various software programs and/or sets of instructions stored in the memory 390 to perform various functions including light field data formatting and light field data processing. Software components stored in the memory include a data formatting module (or set of instructions) 350 for generating data representative of acquired light data in accordance with embodiments of the invention and alight field data processing module (or set of instructions) 355 for processing light field data in accordance with embodiments of the invention. Other modules may be included in the memory for applications of the light field camera device such as an operating system module 351 for controlling general system tasks (e.g. power management, memory management) and for facilitating communication between the various hardware and software components of the device 300, and an interface module 352 for controlling and managing communication with other devices via I/O interface ports.

Figure 3:
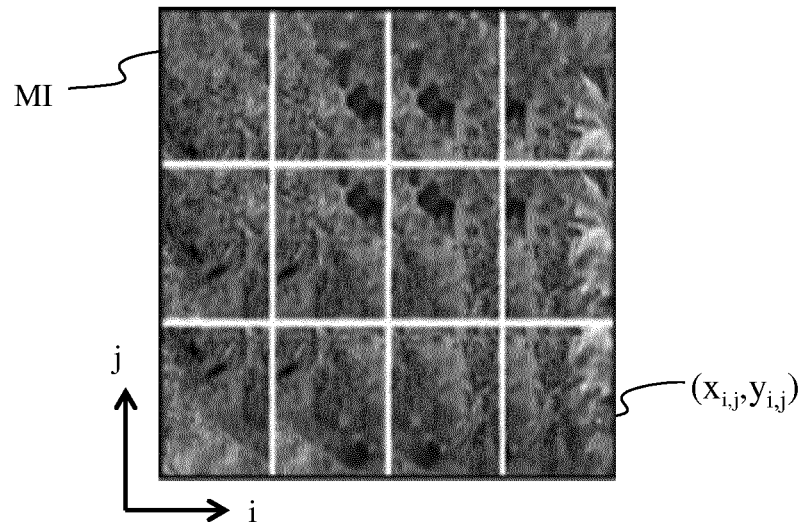
FIG. 3 is an example of a 2D light field image formed on a photosensor array.

FIG. 3 illustrates an example of a 2D image formed on the photosensor array 120 of FIG. 1A or the photosensor array 220 of FIG. 1B. The 2D image, often referred to as a raw 4D light field image, is composed of an array of micro images MI, each micro image being produced by the respective micro lens (i,j) of the microlens army 110,210. The micro images are arranged in the array in a rectangular lattice structure defined by axes i and j. A micro lens image may be referenced by the respective micro lens coordinates (i,j). A pixel PI of the photosensor 120, 220 may be referenced by its spatial coordinates (x,y). 4D light field data associated with a given pixel may be referenced as (x,y,i,j) where x and y are referenced for each micro lens; For example for a micro lens having co-ordinates (i,j) and 20×20 pixels 0<x<19 and 0<y<19.

There are several ways of representing (or defining) a 4D light-field image. For example, a 4D light-field image can be represented, by a collection of micro-lens images as previously described with reference to FIG. 3. A 4D light-field image may also be represented, when recorded by a plenoptic camera by a set of sub-aperture images. Each sub-aperture image of composed of pixels of the same position selected from each microlens image. Furthermore, a 4D light-field image may be represented by a set of epipolar images.

Embodiments of the invention provide representation of light field data based-on the intersection of rays from a light field scene through a plurality of given geometrical planes. In this way the diversity In formats and light field devices may be taken into account.

Figure 4A:
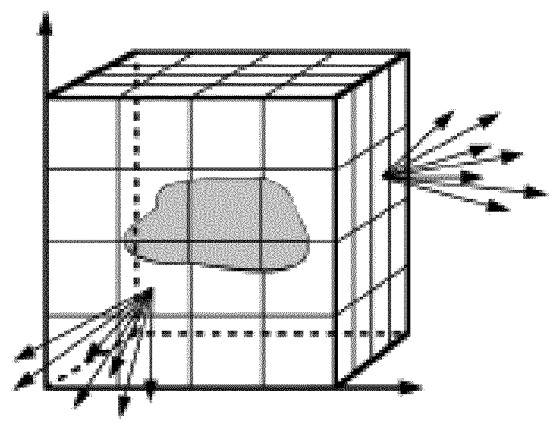
FIGS. 4A and 4B graphically illustrate the use of reference planes for parameterisation of light field data in accordance with one or more embodiments of the invention.

For the purposes of simplicity, a method for parametrizing the four dimensions of lightfeld radiance may be with reference to the cube illustrated in FIG. 4A. All six faces of the cube may be used to parameterize the light-field. In order to parameterise direction, a second set of planes parallel to the cube faces, may be added. In this way the light field may be defined with respect to six pairs of planes with normals along the axis directions as:

$$\vec{i}, -\vec{i}, \vec{j}, -\vec{j}, \vec{k}, -\vec{k}$$

Figure 4B:
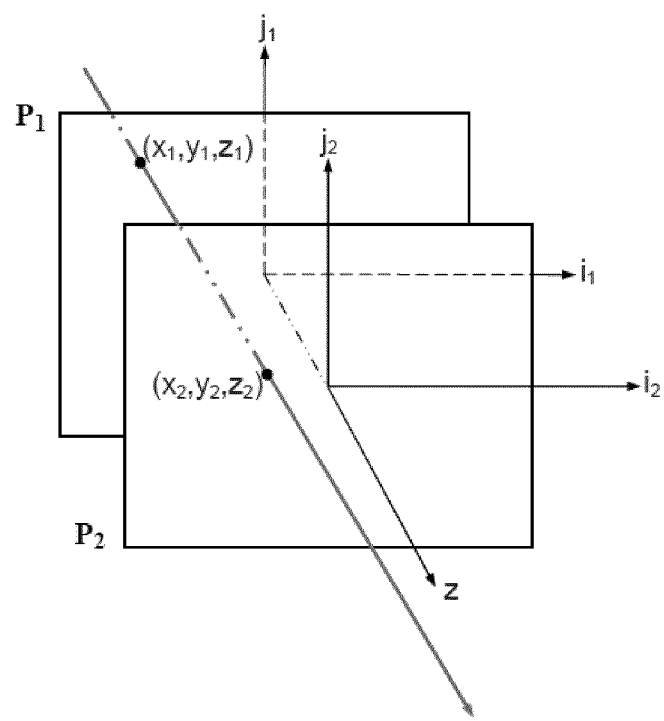

FIG. 4B illustrates a light field ray passing through two reference planes P1 and P2 used for parameterisation positioned parallel to one another and located at known depths $z_1$ and $z_2$ respectively. The light field ray intersects the first reference plane $P_1$ at depth $z_1$ at intersection point $(x_1, y_1)$ and intersects the second reference plane $P_2$ at depth $z_2$ at intersection point $(x_2, y_2)$. In this way the lightfield ray may be identified by four coordinates $(x_1, y_1, x_2, y_2)$. The light field can thus be parameterized by a pair of reference planes for parameterization $P_1$, $P_2$ also referred herein as parameterization planes, with each light field ray being represented as a point $(x_1, y_1, x_2, y_2) \in R^4$ in 4D ray space.

For example an origin of the reference co-ordinate system may be placed at the center of a plane $P_1$ generated by the basis vectors of the coordinate axis system $(\vec{i_1}, \vec{j_1})$. The $\vec{k}$ axis is normal to the generated plane $P_1$ and the second plane $P_2$ can be placed for the sake of simplicity at a distance $z=\Delta$ from plane $P_1$ along the $\vec{k}$ axis. In order to take into account the six different directions of propagation:

$$\vec{i}, -\vec{i}, \vec{j}, -\vec{j}, \vec{k}, -\vec{k}$$

the entire light-field may be characterized by six pairs of such planes. A pair of planes, often refer to as a light slab characterizes the light-field interacting with the sensor or sensor array of the light field camera along a direction of propagation.

The position of a reference plane for parameterization can be given as:

$\vec{x_0} = d\vec{n}$ where $\vec{n}$ is the normal and d is an offset from the origin of the 3D coordinate system along the direction of the normal.

A Cartesian equation of a reference plane for parameterisation can be given as:

$$\vec{n}(\vec{x} - \vec{x_0}) = 0$$

As the light-field is a function of four variables, it can be difficult to illustrate in general. To facilitate illustration a 2D slice may be used and particular sets of light field rays mapped into 2D graphical representations. FIG. 6 shows examples of two different representations of such 2D slices restricted to the $x_1$ and $x_2$ axes. The left hand side, of FIG. 6 illustrates respective 2D slices for different arrangements of light field rays. On the right hand side, the light-field data for each set of rays is graphically illustrated in a 2D ray coordinate system or 2D ray diagram, also referred to as a phase-space system. Each point corresponds to a light ray and is defined by its x intersection point $x_1$ with the first reference plane $P_1$ and its x intersection point $x_2$ with the second reference plane $P_2$.

Figure 5:
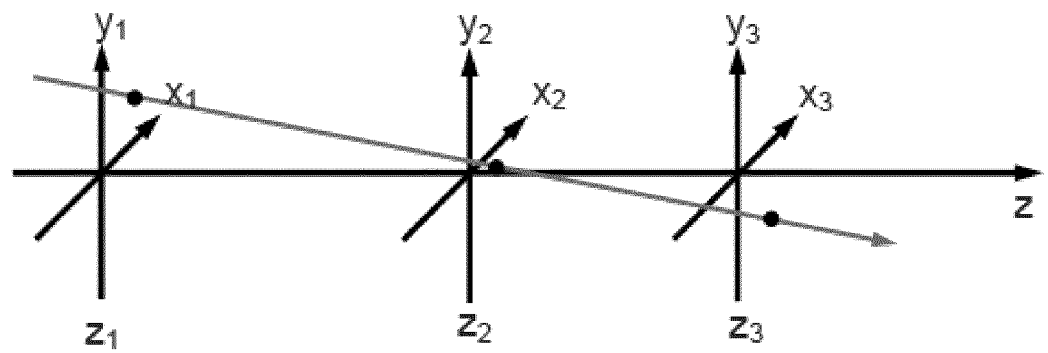
FIG. 5 schematically illustrates representation of light field rays with respect to reference planes in accordance with embodiments of the invention FIG. 6A to 6D graphically illustrate parameterisation of rays including representation of rays in 2D ray diagrams, in accordance with one or more embodiments of the invention.
Figure 6A:
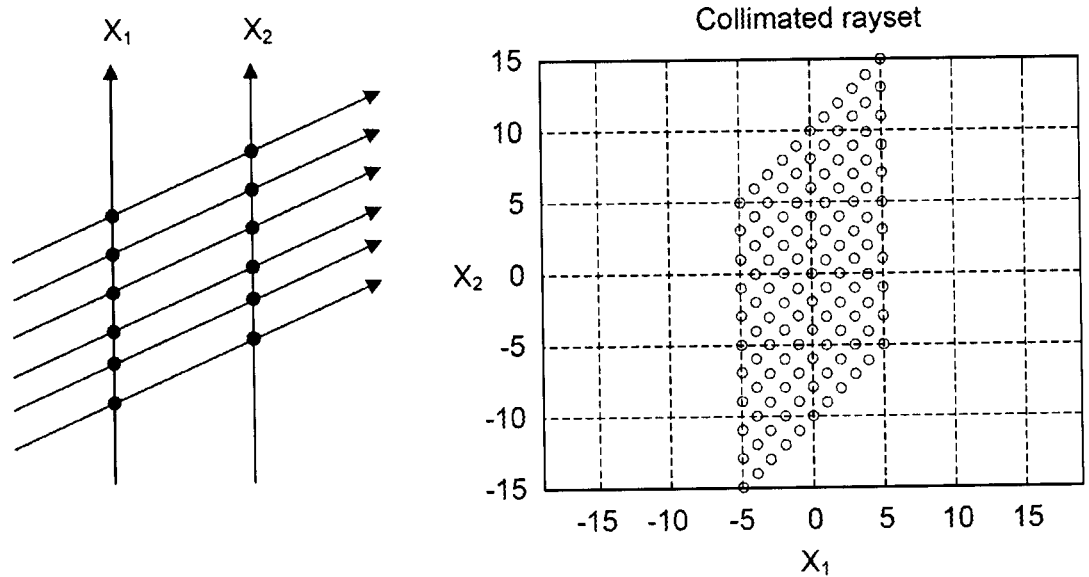
Figure 6B:
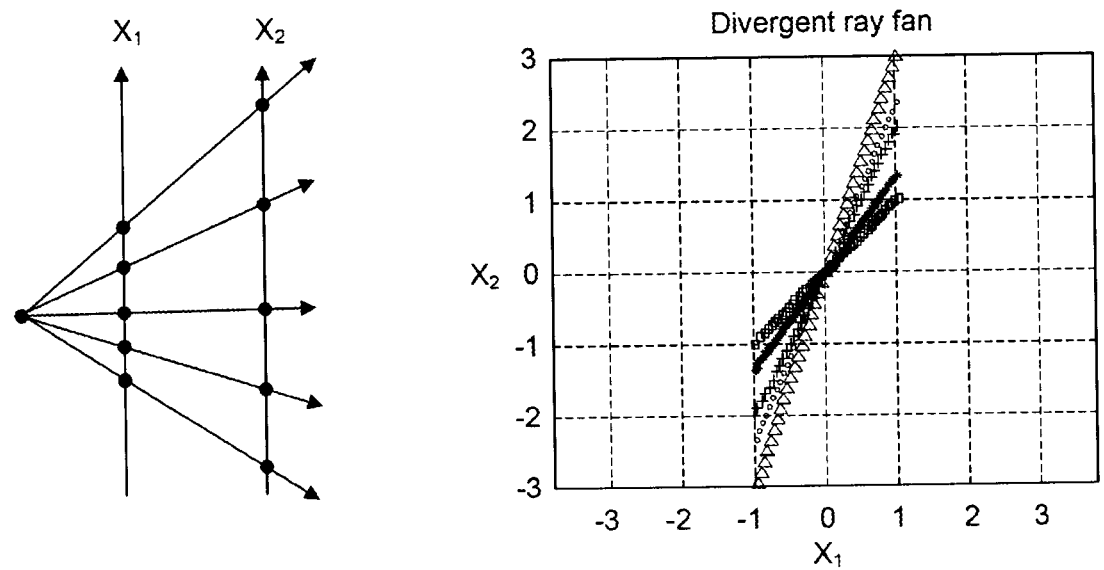
Figure 6C:
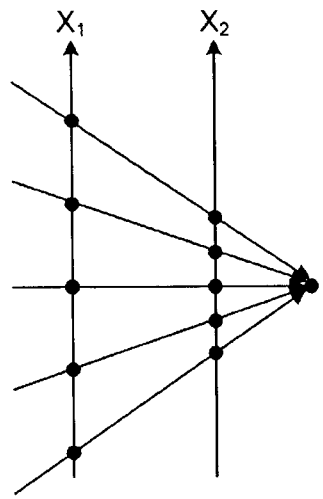
Figure 6C:
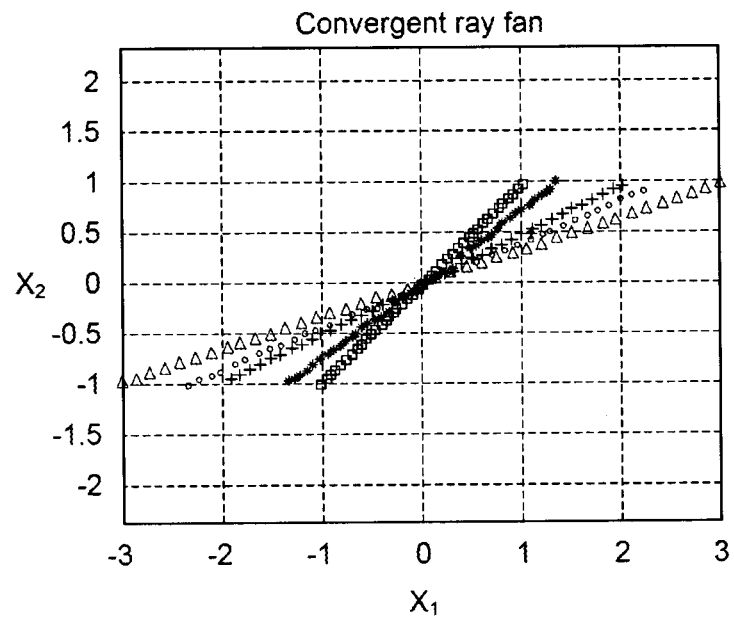

FIG. 6A shows a collimated set of rays, FIG. 6B shows a divergent ray fan, FIG. 5C shows a convergent set of rays and FIG. 5D depicts a focused ray fan.

Figure 6D:
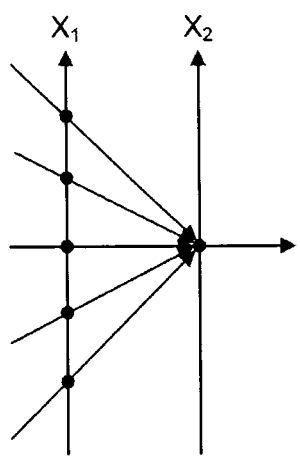
Figure 6D:
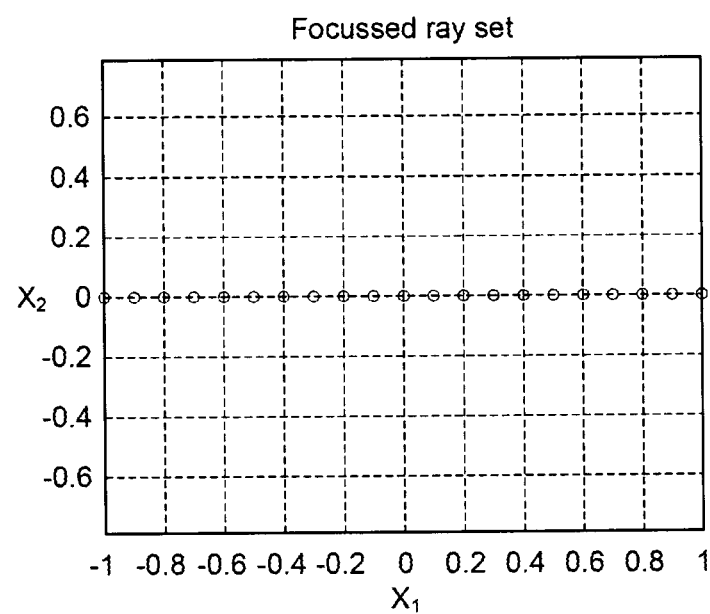

In the 2D ray diagram of FIG. 6A, collimated set of light field rays with various angles of incidence are represented. When the ray set is parallel to the k axis, then each light field ray is plotted along a 45° line. When the set of rays are more inclined, the line shifts upwards in the 2D diagram, and when the set of light field rays are directed downwards, the line also shifts downward (negative x2). Consequently parallel rays will map onto a line at 45°, and if the parallel set of rays makes an angle with the z axis, the $X_2$ line intercept shifts accordingly In the 2D ray diagram of FIG. 6B various different degrees of divergence are plotted. As the point of divergence is moved from infinity toward the axis $X_1$, the 2D ray line representation remains linear but the steepness of the lines increases with the amount of divergence. At the limit, if the point from where the set of rays diverges is on the x1 axis, the rays would be plotted along the vertical axis $x_2$ on the 2D ray diagram. The 2D ray diagram of FIG. 6C, graphically represents a convergent set of rays. As the point of convergence is pulled toward the $X_2$ axis, the rays map to lines of decreasing gradient. The ray diagram of FIG. 6D is the limit when the convergence point is on $X_2$, a focused set of rays, then all rays on the diagram are located on the horizontal axis.

In embodiments of the invention a 4D ray diagram may be used as basic representation of a light field captured by one or more light field cameras with certain portions of the light field data being generated from the raw captured format.

If a light field ray has a known position:

$\vec{x_i}(x_i, y_i, z_i)$ and a normalised propagation-vector:

$\vec{u}(u_1, u_2, u_3)$ the general parametric equation of a ray In 3D may be given as:

$$\vec{x} = t\vec{u} + \vec{x_i}$$

The co-ordinates of the intersection $\vec{x1}$ between the light field ray and a reference plane are given as:

$$\vec{x_1} = \vec{x_i} + \vec{u}\frac{\vec{n}(\vec{x_0} - \vec{x_i})}{\vec{u}\vec{n}} \quad (A)$$

There is no intersection between the light field rays and the reference parameterization if the following condition is not satisfied:

$$(\vec{x_1} - \vec{x_0})\vec{u} > 0$$

Due to the perpendicularity with one of the axes of the system of the pair of reference planes used to parameterize the light-field, one of the components of the ray intersection Is always constant for each plane. Hence if there is an intersection of a light field ray $\vec{x1}$ with the first reference plane, and the intersection $\vec{x2}$ of the said light field with the second reference plane, four coordinates vary and equation A can be used to calculate the four parameters of a light field ray. These four parameters can be used to build up a 4D ray diagram of the light-field.

Assuming parameterization of the light-field with reference to two parameterization reference planes, data representing the light field may be obtained as follows. If a reference system is set as pictured in FIG. 5 a first parameterization plane P1 is perpendicular to z aids at z=z1, a second parameterization plane P2 is arranged perpendicular to the z axis at z=z2 and a ray whose light field parameters are L(x1; y1; x2; y2) are to be rendered at a location z=z3 where a photosensor array of a light field camera is positioned. From equation (A):

$$\vec{x_3} = \vec{x_2} + \vec{u}\frac{\vec{n}(z_3\vec{n} + \vec{x_2})}{\vec{u}\vec{n}}$$

$$\vec{x_3} = \vec{x_1} + \vec{u}\frac{\vec{n}(z_3\vec{n} - \vec{x_1})}{\vec{u}\vec{n}}$$

with $$\vec{u} = \frac{\vec{x_2} - \vec{x_1}}{\|\vec{x_2} - \vec{x_1}\|} = (u_x, u_y, u_z)$$

$\vec{n}(0, 0, 1)$

Developing the above expression gives:

$$x_3 = x_2 + \frac{u_x}{u_z}(z_3 - z_2)$$

$$y_3 = y_2 + \frac{u_y}{u_z}(z_3 - z_2)$$

$$z_3 = z_3$$

$$x_3 = x_1 + \frac{u_x}{u_y}(z_3 - z_1)$$

$$y_3 = y_1 + \frac{u_y}{u_z}(z_3 - z_1)$$

$$z_3 = z_3$$

Both sets of equation should deliver the same point $\vec{x3}$ as the rendered light field ray at the new location. By replacing $u_x; u_y; u_z$ with their corresponding expression as functions of $\vec{x1}$ and $\vec{x2}$, if the second set of equation from the previous block is used and x3 and y3 are added together:

$$x_1 + \frac{z_3 - z_1}{z_2 - z_1}(x_2 - x_1) + y_1 + \frac{z_3 - z_1}{z_2 - z_1}(y_2 - y_1) = x_3 + y_3$$

Leading to the expression:

$$(z_2-z_3)(x_1+y_1)+(z_3-z_1)(x_2+y_2)=(z_2-z_1)(x_3+y_3) \quad (B)$$

Co-ordinates with a subscript $_3$ relate to a known point $(x_3, y_3, z_3)$ where the light field is rendered. All depth co-ordinates $z_i$ are known. The parameterisation planes are in the direction of propagation or rendering. The light field data parameters L are $(x_1, y_1, x_2, y_2)$ The light field rays that form an image at point $(x_3, y_3, z_3)$ are linked by expression (B) which defines a hyper plane in $\mathbb{R}^4$.

This signifies that if images are to be rendered from a two-plane parameterized light-field, only the rays in the vicinity of hyperplanes need to be rendered, there is no need to trace them.

Figure 7:
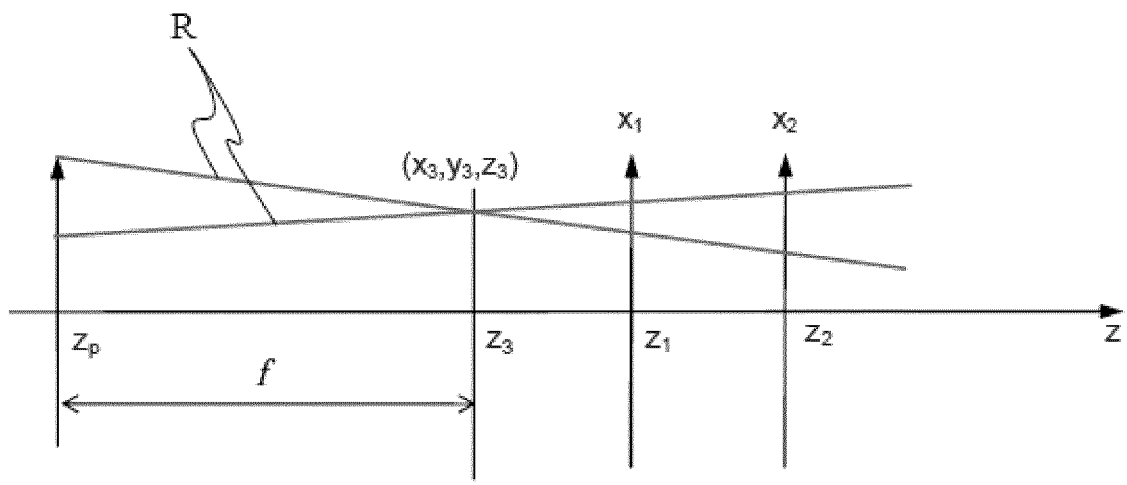
FIG. 7 schematically illustrates parameters for representation of light field rays in accordance with embodiments of the invention.

From calibration of the camera the following parameters can be determined: the centre of projection $(x_3, y_3, z_3)$ the orientation of the optical axis of the camera and the distance f from the pinhole of the camera to the plane of the photosensor. The light field camera parameters are illustrated in FIG. 7. The photosensor plane is located at depth $z_9$. The pixel output of the photosensor is converted into geometrical representation of light field rays. A light-slab comprising the two reference planes $P_1$ and $P_2$ is located at depths $z_1$ and $z_2$, respectively, beyond $z_3$, at the other side of the centre of projection of the camera to the photosensor. By applying a triangle principle to the light rays, pixel coordinates $(x_p, y_p, z_p)$ recording the light projected from the array of microlenses can be mapped to ray parameters i.e. reference plane intersection points $(x_1, y_1, x_2, y_2)$ by applying the following expression:

$$x_1 = \frac{z_3 - z_1}{z_3 - z_p}x_p + \frac{z_1 - z_p}{z_3 - z_p}x_3$$

$$y_1 = \frac{z_3 - z_1}{z_3 - z_p}y_p + \frac{z_1 - z_p}{z_3 - z_p}y_3$$

$$x_2 = \frac{z_3 - z_2}{z_3 - z_p}x_p + \frac{z_1 - z_p}{z_3 - z_p}x_3$$

$$y_2 = \frac{z_3 - z_2}{z_3 - z_p} y_p + \frac{z_1 - z_p}{z_3 - z_p} y_3$$

The above calculation may be extended to multiple cameras with different pairs of triplets $(x_p, y_p, z_p)$ $(x_3, y_3, z_3)$:

In the case of a plenoptic camera, a camera model with an aperture is used and a light field ray is described In the phase space as having an origin $(x_p, y_p, z_p)$ and a direction $(x'_3, y'_3, 1)$. Its propagation unto the plane $(x_3, y_3)$ at depth $z_3$ can be described as a matrix transform. The lens will act as an ABCD matrix to refract the ray and another ABCD propagation matrix will bring the ray onto the light-slab reference planes $P_1$ and $P_2$.

Figure 8:
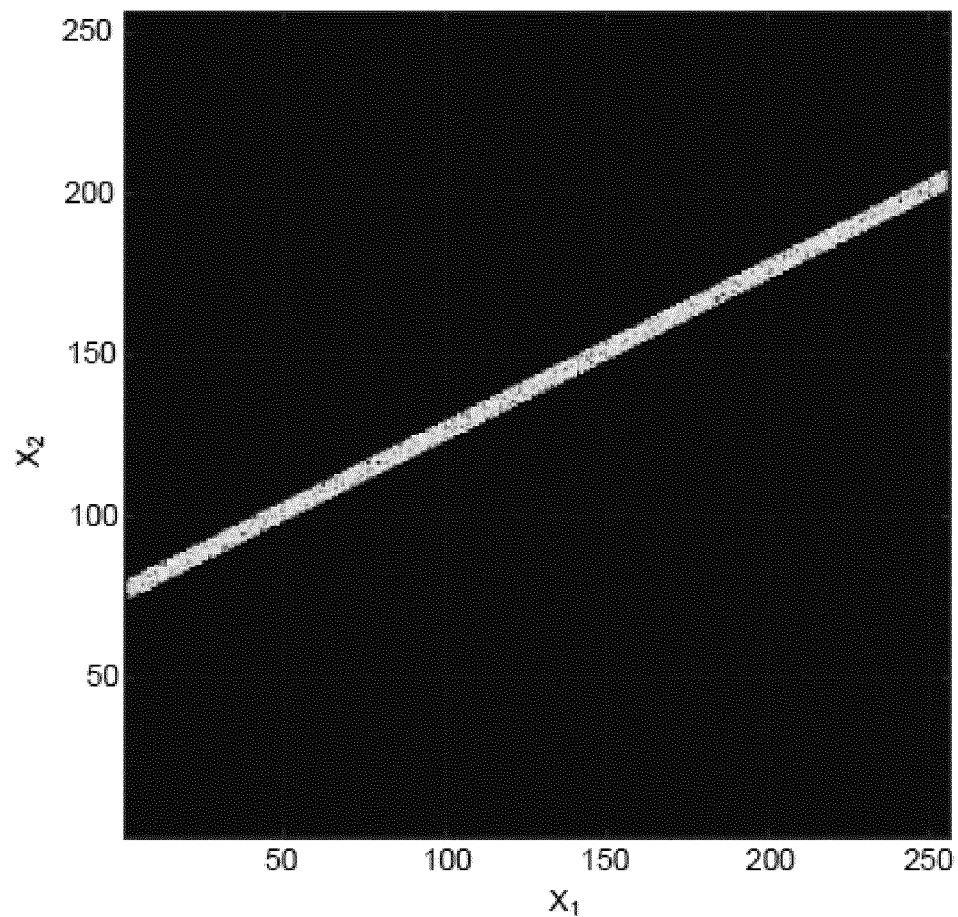
FIG. 8 is a 2D ray diagram graphically illustrating intersection data in accordance with embodiments of the invention.

FIG. 8 is a 2D ray diagram graphically representing intersection data $(x_1, x_2)$ of light field rays captured by a camera at location $x_3=2$ and depth $z_3=2$ with an aperture $|A|<0.5$. The data lines of the ray diagram used to parameterise are sampled by 256 cells providing an image of 266×256 pixels.

If the ray diagram illustrated in FIG. 8 is interpreted as a matrix of 256×256 elements, it can be seen that it is sparsely populated. If the rays were to be saved individually In a file instead of the 4D phase space matrix, this would require saving for each ray, at least 2 bytes (int16) for each position x, or $x_3$ plus 3 bytes for the color, i.e. 7 bytes per ray for a 2D slice light-field, and 11 bytes per ray for its full 4D representation. Even then, the rays would be stored randomly in the file which might be unsuitable for applications that need to manipulate the representation. The inventors of the present invention have determined how to extract only the representative data from the ray diagram matrix and to store the data in a file in a structured manner.

Since the light field rays are mapped along data lines of the 2D ray diagram, it is more efficent to store parameters defining the data line rather than the line values themselves. Parameters defining the data line such as, for example, a slope defining parameters and an axis intercept d may be stored with the set of light field rays belonging to that data line.

This could require for example as little as 2 bytes for slope parameter s, 2 bytes for slope parameter d and then only 3 bytes per ray. Moreover, the rays may be ordered along lines in the file. In order to set lines through matrix cells so called digital lines are generated which approximate the ray lines with minimum error.

Figure 18A:
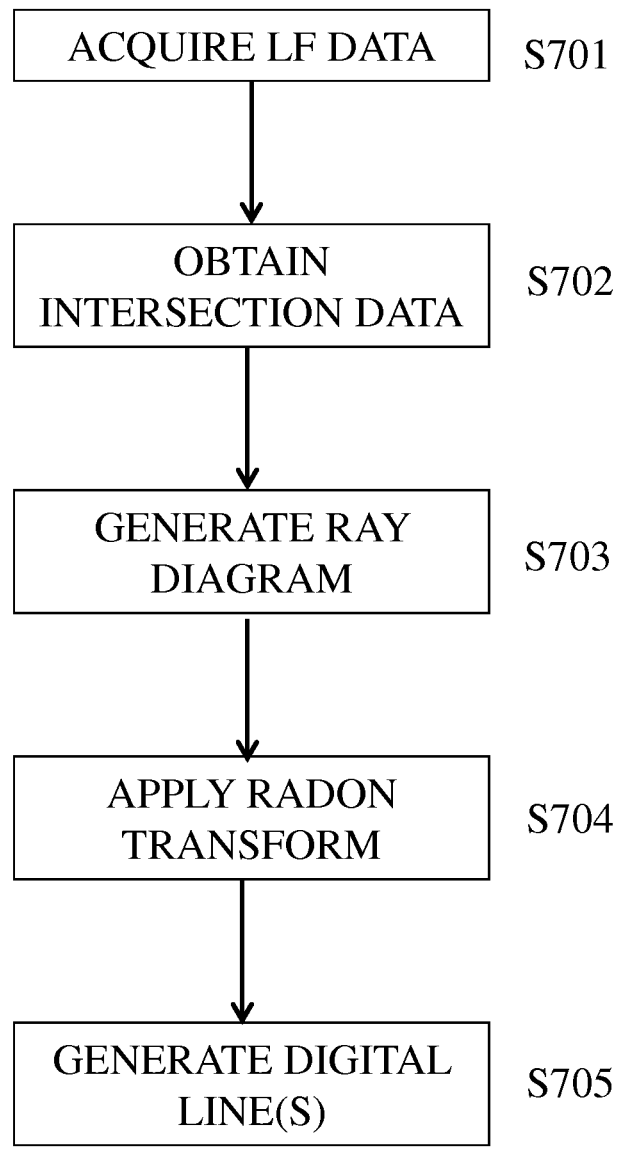
FIG. 18A is a flow chart illustrating steps of a method in accordance with one or more embodiments of the invention.

To locate the data lines and to obtain slope parameter s and intercept parameter d step S704 a Radon transform is performed by line detection module 704 on the ray diagram generated in step S703 (see FIG. 18A).

From the obtained slope parameter s and intercept parameter d a representative digital line is generated by digital line generation module 706 in step S706 (see FIG. 18A). In this step digital lines are generated by approximating an analytical line to its nearest grid point, for example by applying Bresenham's algorithm. Indeed Bresenham's algorithm provides a way to provide a digital line with minimal operation. Other methods may apply a fast discrete Radon transform calculation. An example of Bresenham application is one adapted from the following reference: http://www.cs.helsinki.fi/group/goa/mallinnus/lines/bresenh.hml.

The digital format defines the data line by two points of a grid (0,d) and (N–1, s) d being the interception corresponding to the value of $x_2$ when $x_1=0$ and s being the slope parameter corresponding to the value of $x_2$ when $x_1=N-1$. From the digital format generated the slope a of each individual line may be expressed as a function of d and s, as:

$$a = \frac{s - d}{N - 1}$$

where:

$s \in \{0, 1, \ldots, N-1\}$ and $d \in \{0, 1, \ldots, N-1\}$

Figure 9:
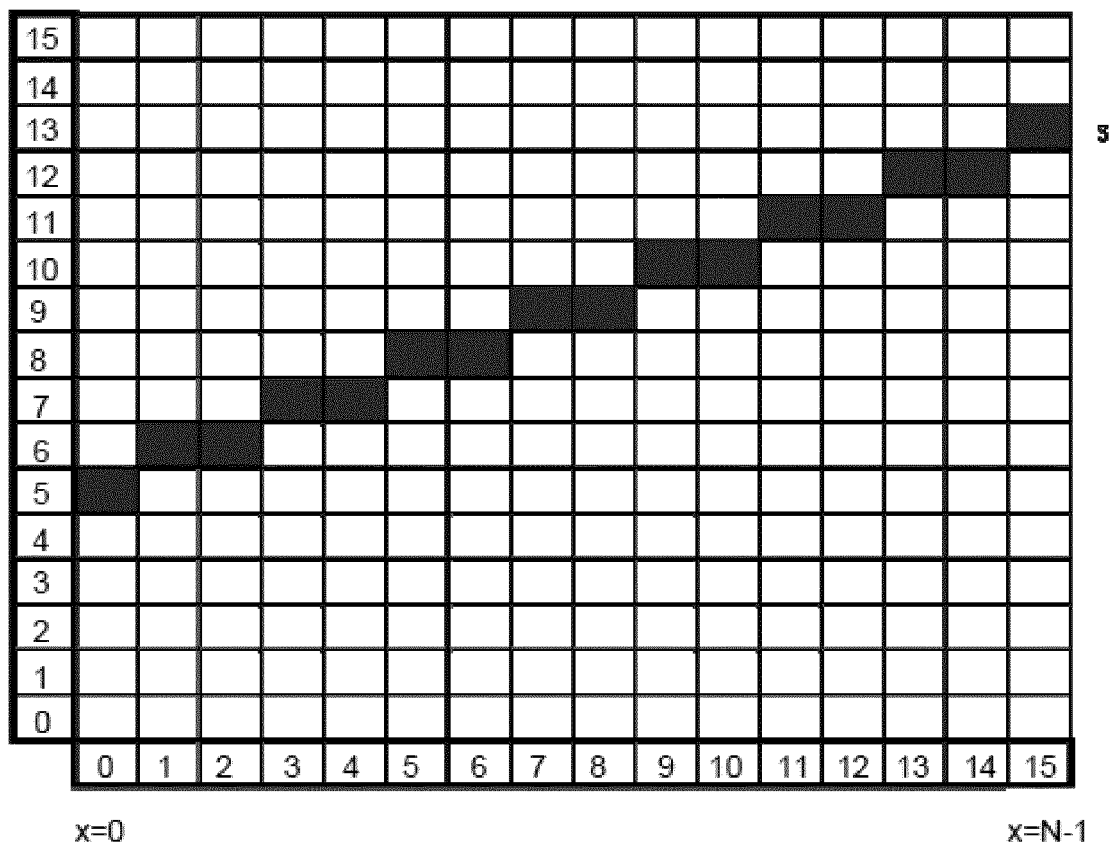
FIG. 9 graphically illustrates a digital line generated in accordance with embodiments of the invention.

FIG. 9 illustrates an example of a digital line generated by application of Bresenham's algorithm.

Figure 10:
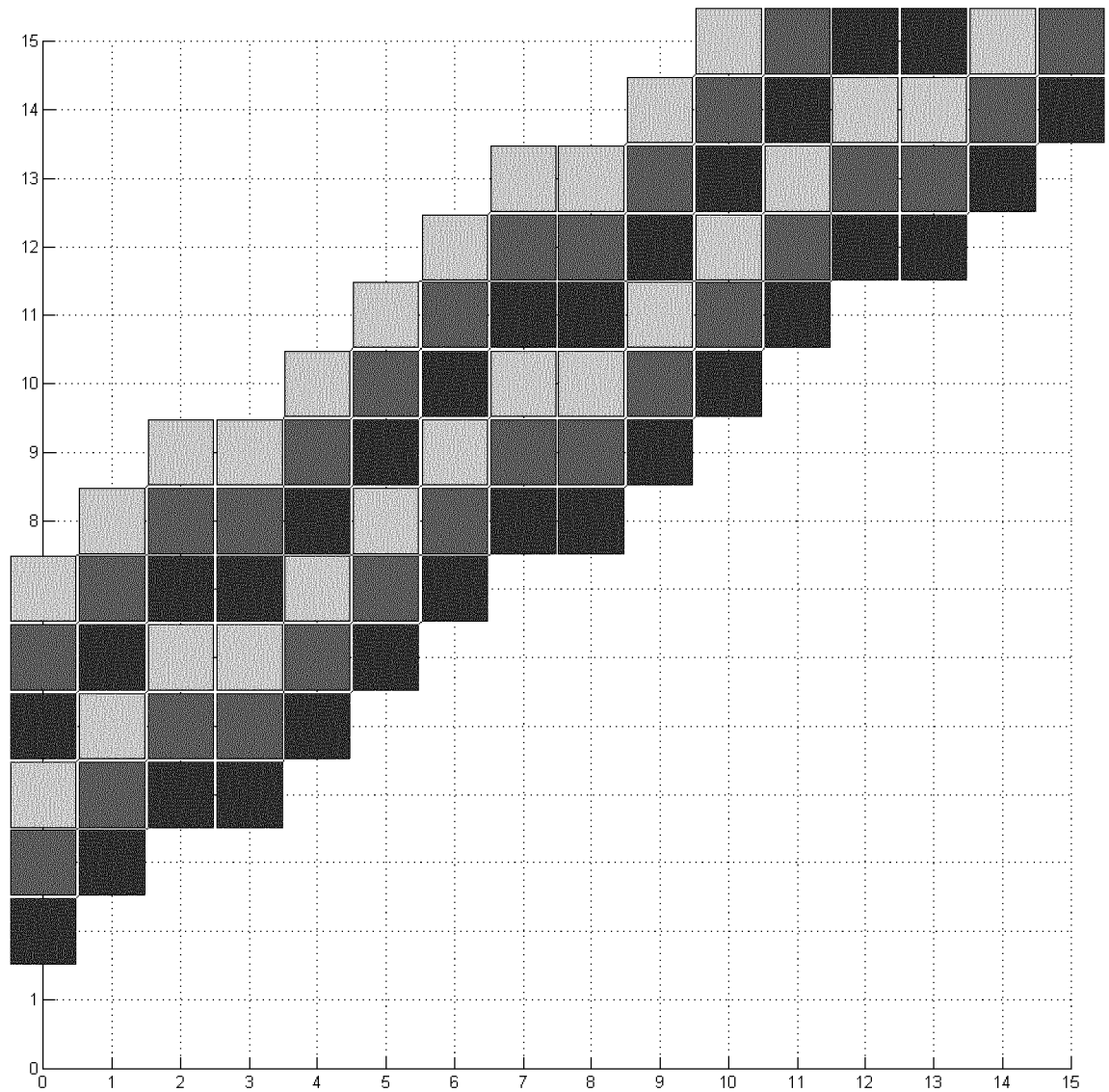
FIG. 10 graphically illustrates digitals line generated in accordance with embodiments of the invention.

FIG. 10 illustrates a group of digital lines having the same slope a (or s-d) but different intercepts d, the group of data lines being contiguous. The group of data lines is referred to herein as a bundle of lines and corresponds to a beam resulting from the camera not being ideally pinpoint. Each line addresses different pixels. In other words, one pixel belongs only to a unique line of a bundle with the same slope but different intercepts. The upper and lower boundaries of the axis interceptions d are given as $d_{max}$ and $d_{min}$ respectively.

Ray data parameterized by a sampled pair of lines (in 2D) and belonging to one camera, belong to a family of digital lines (beam) in the phase space used for representing the data. The header of the beam can simply contain the slope a and the thickness of the beam defined by the upper and lower boundaries of the axis interceptions $d_{max}-d_{min}$. The ray values will be stored as RGB colors along digital lines whose header can be d and s. Void cells of the ray diagram in the sampled space do not need to be stored. Coordinates x1; x2 of the rays can be deduced from the parameters d, s and from the position of the cell along the digital line.

Table 1 is an example of a data representation format in accordance with an embodiment of the invention in the case of 2D ray diagram storage. It will be understood that for a 4D case the table would be extended in y1 and y2 dimensions.

TABLE 1

| Data representation format | | | | | |
|---|---|---|---|---|---|
| Tags | | | Data | | |
| Parametrization plane offset $z_2$-$z_1$ ($z_3$ is relative to $z_1$) (float) | | | $\Delta z$ | | |
| Width in number of $x_1$ cells (integer) | min $x_1$ value (float) | max $x_1$ value (float) | N | $x_{1min}$ | $x_{1Max}$ |
| Width in number of $x_2$ cells (integer) | min $x_2$ value (float) | max $x_2$ value (float) | M | $x_{2min}$ | $x_{2Max}$ |

TABLE 1-continued

Data representation format

| Tags | | | Data | | | |
|---|---|---|---|---|---|---|
| Number of cameras (integer) | | | n | | | |
| $Cam_1$ focus (2 floats) | | | x31 | z31 | | |
| lowest $cam_1$ intercept in $(x_1, x_2)$ | $cam_1$ steepness | $cam_1$ number of digital lines in $x_1, x_2$ | $d_1$ | $s_1$ | m(1) | |
| data line (m(1) *N*3 bytes) | | | $RGB_0$ | $RGB_1$ | ... | $RGB_{m(1)*N}$ |
| ... | | | ... | ... | | |
| ... | | | ... | ... | ... | ... |
| $Cam_n$ focus (2 floats) | | | x31 | Z31 | | |
| lowest $cam_n$ intercept in $(x_1, x_2)$ | $cam_n$ steepness | $cam_n$ number of digital lines in $x_1, x_2$ | $d_n$ | $s_n$ | m(n) | |
| data line (m(n) *N*3 bytes) | | | $RGB_0$ | $RGB_1$ | ... | $RGB_{m(n)*N}$ |

The data includes the following parameters:
the number of cells of the matrix of the 2D diagram (N by M) of the interception data $x_1$, $x_2$, where N corresponds to the number of $x_1$ cells and M corresponds to the number of $x_2$ cells.
parameters d and s defining the digital data line corresponding to one or more light field rays extending in the grid (of matrix N by M) from (0,d) to (N−1, s), as for example illustrated in FIG. 9.
the number of acquisition cameras n
the RGB data of each date line
Parameters to be estimated from the lightfield or from camera's geometry are the slope a the lower and upper bounds of the digital line intercepts $(d_{min}, d_{max})$, and the digital line parameters $(d_i, s_i)$. The discrete Radon transform has already been discussed as a tool to measure the support location of the light-field In the ray diagram.

Figure 11A:
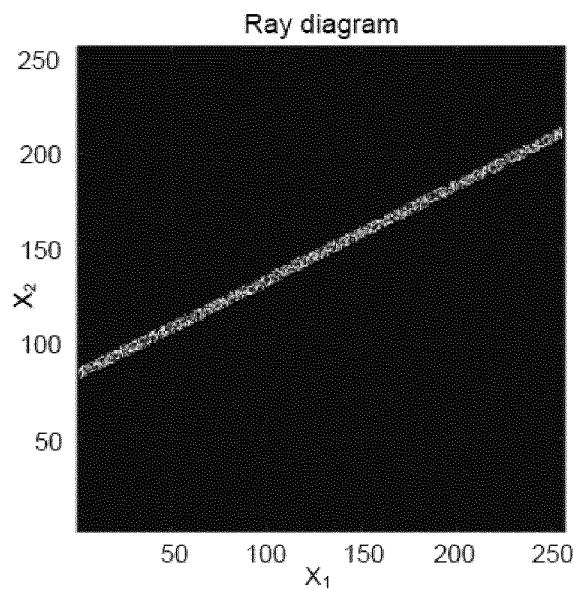
FIG. 11A-11C graphically illustrate Radon transforms applied to a digital line in accordance with embodiments of the invention.
Figure 11B:
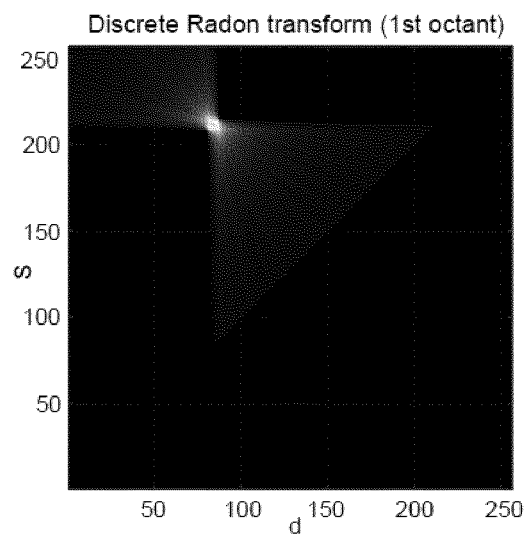
Figure 11C:
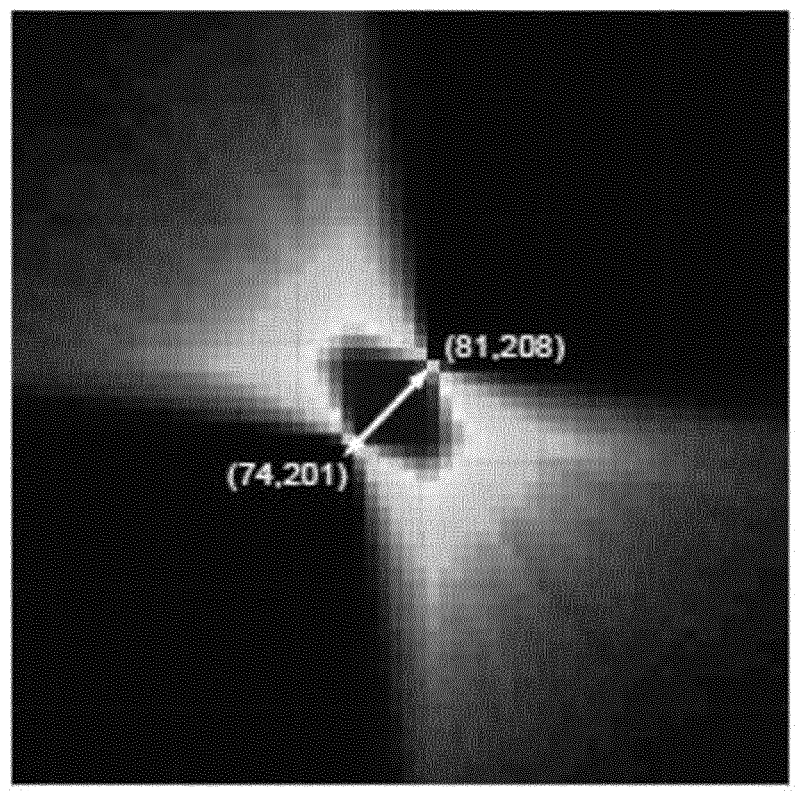

FIG. 11B shows the discrete Radon transform in the digital line parameter space (d,s) of the datalines of FIG. 11A, FIG. 11C is a zoom of the region of interest comprised in FIG. 11B. The beam of digital lines is located by the search for the maximum value parameters. There could be some offset between the geometrical center of symmetry of the DRT and the actual position of the maximum due to image content so that later on, an algorithm is used to pin-point the center of symmetry instead of the maximum. Then, the waist of the beam transform as shown on FIG. 11C is easy to find to give the values $(d_{min}, d_{max})$. Point $(d_{min}=74, s=201)$ is the lower envelope of the beam of digital lines from FIG. 11A, and point $(d_{max}=81, s=208)$ is the upper envelope of the beam of digital lines.

The equations of two orthogonal 2D sliced spaces from equation B is given as.

$$(z_2-z_3)(x_1+y_1)+(z_3-z_1)(x_2+y_2)=(z_2-z_1)(x_3+y_3) \quad (C)$$

If a 2D slice for $x_i$ coordinates is taken, the equation of the beam of lines where ray data through an aperture of size A at $(x_3, y_3, z_3)$ will map is given as:

$$x_2 = \frac{(z_3-z_2)}{(z_3-z_1)}x_1 + \frac{(z_2-z_1)}{(z_3-z_1)}(x_3 \pm A) = mx_1 + (d_{max_x} - d_{min_x}) \quad (D)$$

Similarly, if a 2D slice is taken for $y_i$ coordinates:

$$y_2 = \frac{(z_3-z_2)}{(z_3-z_1)}y_1 + \frac{(z_2-z_1)}{(z_3-z_1)}(y_3 \pm A) = my_1 + (d_{max_y} - d_{min_y}) \quad (E)$$

As previously described, the values of m and $d_{max_x}$, $d_{min_x}$, $d_{max_y}$, $d_{min_y}$, may be evaluated in the discrete domain To localize the characteristics of a light-field as defined by the format discussed previously, there is no need to perform a 4D discrete Radon transform. If two orthogonal 2D DRT are obtained, measurements can be performed of the slope m of the hyper-plane and the beam width of the digital hyper-planes where all data concentrates in the 4D ray-diagram.

This simpler procedure of location assumes a circular entrance pupil A so that $d_{max_x}$, $d_{min_x}$, $d_{max_y}$, $d_{min_y}$ will encompass all hyper-planes intercepts, some values written in the format will contain no values.

In embodiments of the invention Intersection data $(x_1, y_1, x_2, y_2)$ geometrically defining intersection of light field rays with reference planes $P_1$, $P_2$ is obtained by steps of back tracing and parameterization as will be described.

Figure 12A:
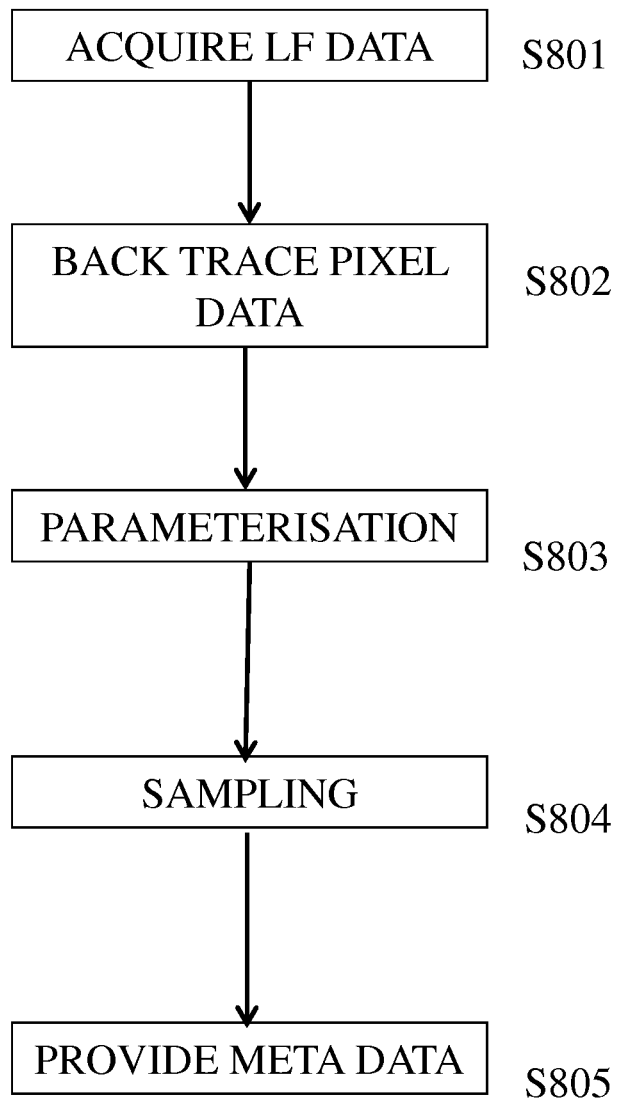
FIG. 12A is a flow chart illustrating steps of a method In accordance with one or more embodiments of the invention.
Figure 12B:
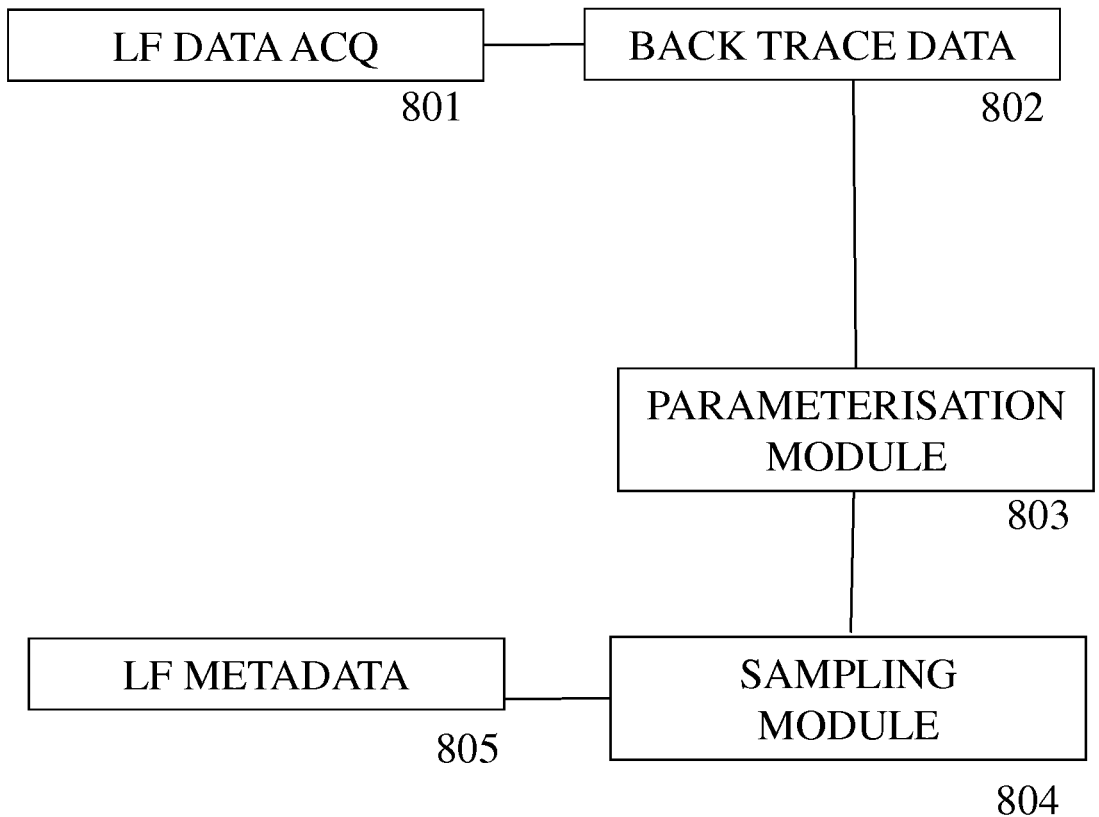
FIG. 12B is a functional block diagram illustrating modules of a device for providing a light data format in accordance with one or more embodiments of the invention.

FIG. 12A is a flow chart illustrating the steps of a method for generating data representative of a light field according to one or more embodiments of the invention. FIG. 12B is a block diagram schematically illustrating the main modules of a system for generating data representative of alight field according to one or more embodiments of the invention.

In a preliminary step S801 of the method raw light field data is acquired by a light field camera 801. The raw light field data may for example be In the form of micro images as described with reference to FIG. 3. The light field camera may be alight field camera device such as shown in FIG. 1A or 1B and 2A and 2B. In general the data is provided In pixel form corresponding to pixels of the light sensor detecting the light.

In step S802 the acquired light field data is processed by back tracing module 702 generate from the pixel data, lightfield rays corresponding to the captured light field.

Pixel back-tracing refers to the operation of ray generation from pixel and camera data. This process is typically camera specific. Each camera type has its own specific art of mapping rays to pixels. A plenoptic camera registers 2D arrays of images in a very specific way. Other types of camera can acquire the 4π steradian solid angle and the device is handled differently for re-generating the rays. Since the pixel back-tracing is specific to each acquisition system, different modules of back-tracers have to be developed. A traditional light field camera can be described and modeled as a pinhole and the back-tracing is straightforward. A plenoptic 2.0 camera is more difficult to back-trace, in particular if the micro-lens array has three different lenslet locals. For the latter case back-tracing may be obtained indirectly through the focal-stack.

Figure 13A:
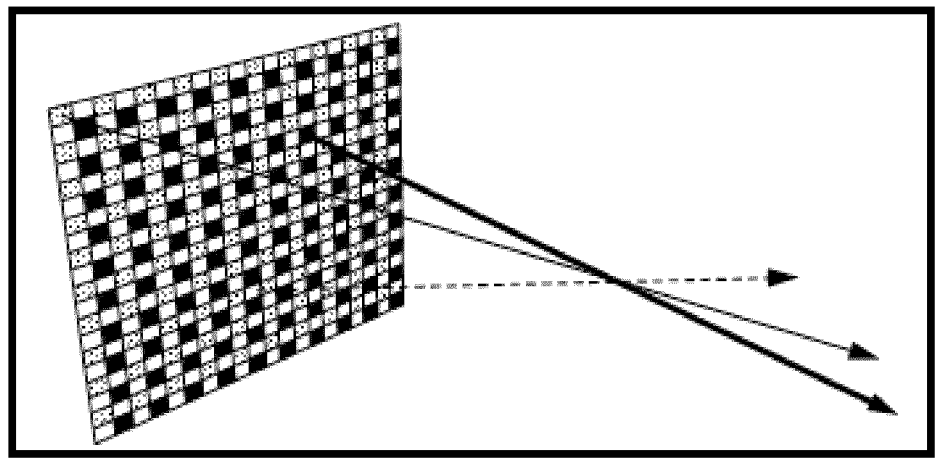
FIG. 13A schematically illustrates examples of pixel back tracing according to embodiments of the invention.
Figure 13B:
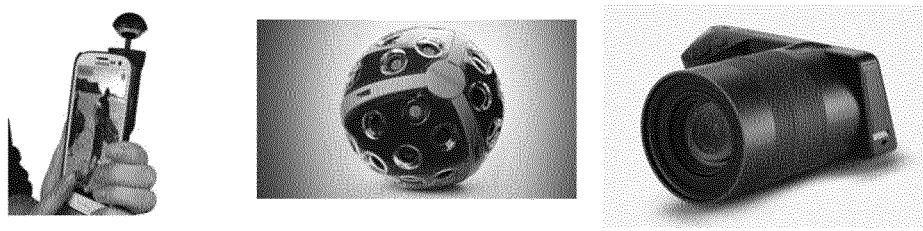
FIG. 13B schematically illustrates examples of acquisition devices used for ray back tracing.

FIG. 13A schematically illustrates an example of back tracing. FIG. 13B illustrate examples of acquisition devices used for ray back tracing for which algorithms are to be specified. The process of ray back-tracing as illustrated in FIG. 13A is modeled by a pinhole camera.

Whether or not the original pixel array should be demozaicked into a full RGB array or kept as a raw data array can be handled by assigning to the back-traced ray either a full RGB value, or only a unique color value.

For back-tracing with a pinhole camera model, camera calibration is performed to locate the position of the pinhole which acts as the common point that every ray intersects. The calibration also provides pixel sizes and distance of the pixel plane to the center of projection so that each pixel can be converted easily as a ray passing through the pinhole in the global coordinate system and whose direction is the direction from the pixel to the pinhole.

Each ray bundle integrated at each pixel and sustended by the lens output pupil can be reduced to the mean beam direction of propagation from the lens to the pixel as envisaged by the simple pinhole model. An example of how to use camera intrinsic and extrinsics to back-trace the pixels can be found at <http://www.ics.uci.edu/~majumder/vispercep/cameracalib.pdf>.

In order to illustrate the pixel back-tracing procedure, it is supposed for the sake of simplicity that the center of projection of the camera is at (0, 0, 0), the image plane centered at (0; 0; f). The camera is not rotated, its principal axis is pointing in the Z direction. It is also supposed that the pixels are squares so that $m_u = m_v = m$ pixels·meter$^{-1}$. Finally, the image plane is translated by $(t_u, t_v)$ in such a way that the bottom left pixel is at (u=0; v=0). The pixels are addressed by their row-column indexes pair (i, j). If I is the image position vector in pixels (i, j, 1), then the relation between the pixel and a point P(X, Y, Z) that maps to that pixel through the central projection, is:

$$\begin{pmatrix} i \\ j \\ 1 \end{pmatrix} = \begin{pmatrix} mf & 0 & mt_u \\ 0 & mf & mt_v \\ 0 & 0 & 1 \end{pmatrix} \begin{pmatrix} X \\ Y \\ Z \end{pmatrix} \Leftrightarrow I = KP \quad (F)$$

Knowing m, f $t_u$, $t_v$ from a calibration step, back tracing the pixel leads to:

$$P = K^{-1} I \quad (G)$$

P is a point In 3D space where a ray from pixel (i,j) would pass through. With one position P, and since the ray passes through (0,0,0) the direction is given by the vector P(X,Y,Z).

In step S803 a process of parameterization is performed. Parameterization is the process of identifying uniquely each ray with tags. As a ray passes through a position and has a direction, the most straightforward parameterization would be a set of 6 real numbers (x, y, z, u, v, w) mixing spatial and directional coordinates. For the sake of simplicity a two plane parameterization as already discussed is adopted. The question which is very often asked is where to put those planes with respect to the acquisition system. Often in the literature, in particular for plenoptic cameras, for some calculation convenience, one is placed at the sensor, another one on the lenslets array or main lens. Those positions should be avoided, because micro-lenses have a thickness, so where exactly shall we put one of the planes? Main lenses have a very complicated lens prescription which is unknown. So the best is to put the planes outside of the acquisition system. Assuming a first place is located at z=z1 and a second one at z=z2 with z2>z1. From equation (F) it can be found that the parameters for a ray which has been back-traced from pixel (I, j) as:

$$\begin{pmatrix} x_1 \\ y_1 \\ z_1 \end{pmatrix} = \begin{pmatrix} mf & 0 & mt_u \\ 0 & mf & mt_v \\ 0 & 0 & 1 \end{pmatrix}^{-1} \begin{pmatrix} i \\ j \\ 1 \end{pmatrix}$$

The first two lines of the equation are divided by Z1 according to the rule for homogenous coordinates. The second set of parameters which come from the intersection with the second plane can also be written as:

$$\begin{pmatrix} x_2 \\ y_2 \\ z_2 \end{pmatrix} = \begin{pmatrix} mf & 0 & mt_u \\ 0 & mf & mt_v \\ 0 & 0 & 1 \end{pmatrix}^{-1} \begin{pmatrix} i \\ j \\ 1 \end{pmatrix}$$

Since the couple $(z_1, z_2)$ is known it can be seen from previous derivation that the ray be uniquely described by the 4-uplet $(x_1, y_1, x_2, y_2) \in R^4$ In addition, the ray is assigned with a RGB value. So to represent the ray by such parameterization, 4 floats and 3 bytes would be required resulting in a total of 19 bytes (but the ray space has not yet been sampled) In the image based format, the elemental data is represented by 2 Integers and 3 bytes only. So it may be seen that this parameterization adds a lot of data to the content and in general, the light-field being a four dimensional data set, it needs an amount of storage which is not manageable as it is.

In step S804 sampling and reduction are performed. To build up a light field data format a numerical representation of the light field data is required. Since up to now, the rays are described by real numbers, the ray space coordinate system is sampled in order to assign for each ray a unique 4-uplet of integer indexes rather than real numbers. For that purpose the 4D ray-space $x_1, y_1, x_2, y_2$ is sampled in $\Delta x_1, \Delta y_1, \Delta x_2, \Delta y_2$, steps. Consequently, each ray is uniquely defined by the 4 indexes $(i,j,k,l) \in N^4$ such that $(x_1, y_1, x_2, y_2) \approx (x_{1min}, y_{1min}, x_{2min}, y_{2min}) + (i\Delta x_1, j\Delta y_1, k\Delta x_2, l\Delta y_2)$ where the indexes best approximate the real ray's parameters. This practically means that the indexes are such that:

$$x_{1min} + i\Delta x_1 \leq x_1 < x_{1min} + (i+1)\Delta x_1$$

$$y_{1min} + j\Delta y_1 \leq y_1 < y_{1min} + (j+1)\Delta y_1$$

$$x_{2min} + k\Delta x_2 \leq x_2 < x_{2min} + (k+1)\Delta x_2$$

$$y_{2min} + l\Delta y_2 \leq y_2 < y_{2min} + (l+1)\Delta y_2$$

Figure 14:
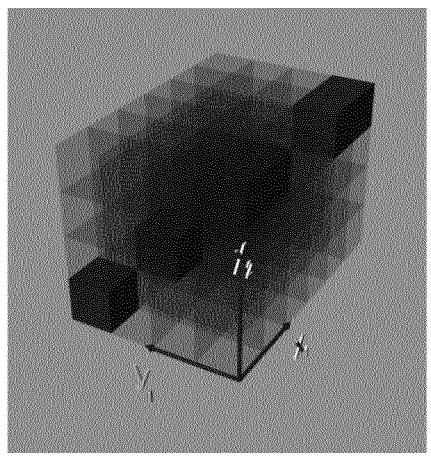
FIG. 14 is an example of a parameter space in accordance with embodiments of the invention.

The reduction is the process of defining the compact support space of the light-field generated by the rays which have been back-traced from pixels acquired by the light field camera. FIG. 14 schematically illustrates the reduction process limited to a 3D space where the support cells of the light-field are shaded in. This figure shows the support in the sampled space, but the support can also be known In the continuous domain by analytical derivations. In the discrete domain, the support can be found by a Discrete Radon Transform of the light-field in the 4D parameter space. More precisely, it is found by two orthogonal DRTs.

Figure 15:
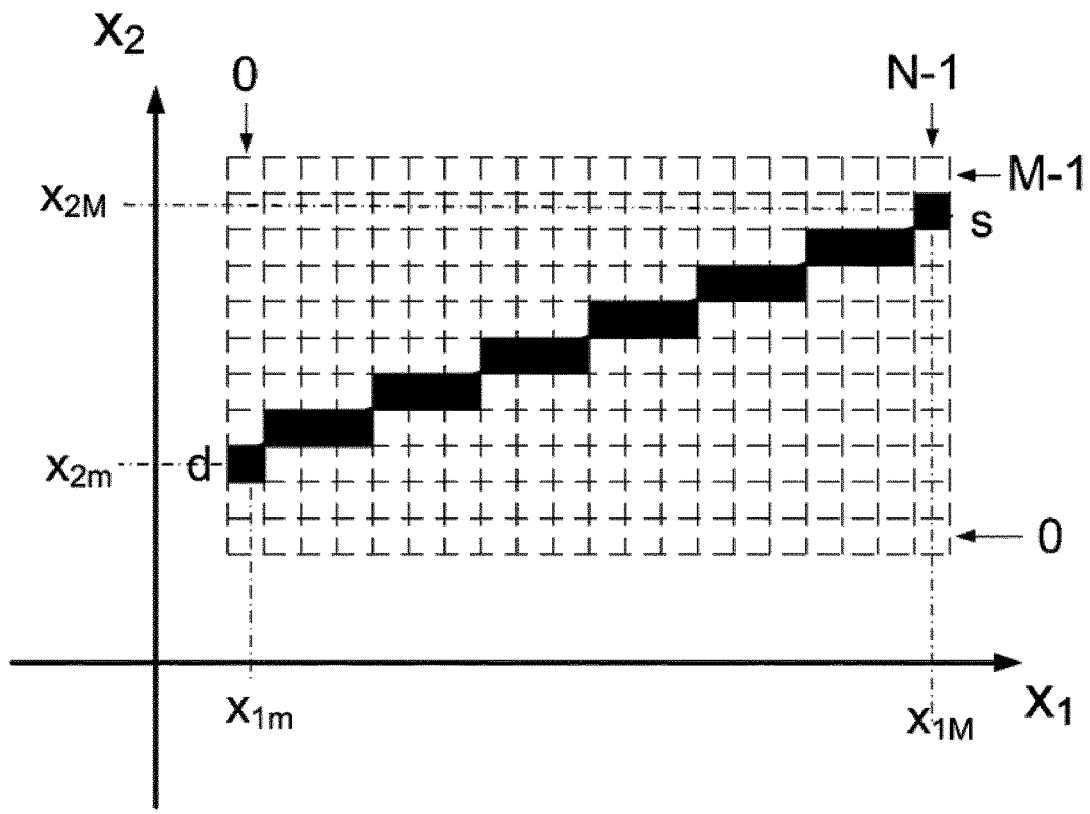
FIG. 15-17 are examples of sampled light ray parameters in accordance with embodiments of the invention

In FIG. 15, the support of the light-field domain in parameter space is depicted by the shaded cells. This is the continuous support. The support is sampled by the grid lines which build cells. There are N×M cells ranging from [0, N−1; 0, M−1]. The digital line begins at column-row index (i=0; j=d) and ends at (i=N−1; j=s).

The following illustrative example is restricted to a 2D slice. As it is known from previous section, the analytic equation of the line of blocks can be found for a system which has a center of projection located at known coordinates $(x_3, y_3, =0, z_3,) \in R^3$ If there are two parameterization lines located at $(z_1, z_2) \in R^2$ which are also know the light field rays will be located on an affine line of equation:

$$x_2 = \frac{z_2 - z_2}{z_3 - z_1} x_1 + \frac{z_2 - z_1}{z_3 - z_1} x_3 = a x_1 + b \quad (H)$$

where:

$$x_{1_m} \leq x_1 \leq x_{1_M}$$

$$x_{2_m} \leq x_2 \leq x_{2_M}$$

are the limits on the parameterization lines which bound all ray parameters $(x_1, x_2)$. The affine line passes through the shaded cells along a digital line. The cells size are:

$$\Delta x_1 = \frac{x_{1_M} - x_{1_m}}{N}$$

$$\Delta x_2 = \frac{x_{2_M} - x_{2_m}}{M}$$

The 4D space may now generalized. The hyper plane support of an acquired light field is given as:

$$(z_2-z_3)(x_1+y_1)+(z_3-z_1)(x_2+y_2)=(z_2-z_1)(x_3+y_3)$$

Where variables indexed by 3 are known as well as $Z_1$ and $Z_2$. To simplify the metadata the equation is written in canonical form:
The following lower and upper bounds are given:

$$x_{1_m} \leq x_1 \leq x_{1_M}$$

$$x_{2_m} \leq x_2 \leq x_{2_M}$$

$$y_{1_m} \leq y_1 \leq y_{1_M}$$

$$y_{2_m} \leq y_2 \leq y_{2_M}$$

And the following cell sizes $$\Delta x_1 = \frac{x_{1_M} - x_{1_m}}{N}$$

$$\Delta x_2 = \frac{x_{2_M} - x_{2_m}}{M}$$

$$\Delta y_1 = \frac{y_{1_M} - y_{1_m}}{L}$$

$$\Delta y_2 = \frac{y_{2_M} - y_{2_m}}{K}$$

Figure 16:
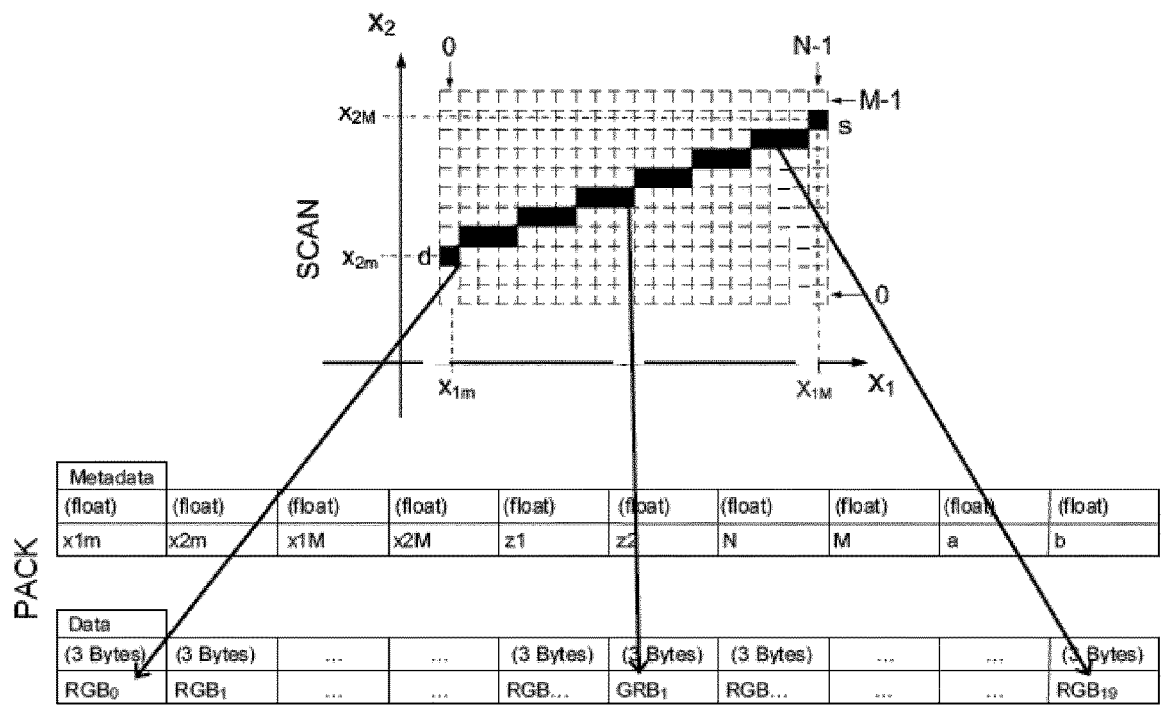

Since the 4D parameter space is filled up (or the 2D space in the example illustrated on FIG. 15) cell indexes may be used to scan the data and save RGB value alone into a format (or Pack). The file format's metadata will contain all the necessary values for converting back each value written down into the file format into a sampled 4-uplet parameter for the ray which reverses the action of Packing, referred to as Unpacking the process may be illustrated with a small visual example by slicing the light-field and reducing it into a 2D space, if the mathematical notation from the previous sub-section is followed, the first column index is i=0. There is data present in this column at cell j=2. In order to find the indexes of the pixels of the digital line the following data is required:

$$x_{1_i} = x_{1_m} + i \Delta x_1 \quad (I)$$

$$x_{2_j} = a x_{1_i} + b$$

$$j = E\left(\frac{x_{2_j} - x_{2_m}}{\Delta x_2}\right)$$

Where E stands for the integer function, which rounds down any real number to a smaller natural number (integer). Hence scanning the data is a simple matter of incrementing i from 0 to N−1. For each i, the data lies in the cell (i,j) with j calculated by the previous set of equations. For each i, the RGB value carried by the ray is stored, and this RGB value is found in that cell (i,j). In order to later unpack the data from the format, it is known that each cell of the format is indexed by a rank i, and to regenerate the rays parameters (i,j), the values of $x_{1m}$, $x_{2m}$, $x_{1M}$, $x_{2M}$, N, M, a, b, $z_1$, $z_2$ are stored as metadata in the file format FIG. 16 illustrates the process of Scan'n'Pack and the file format structure needed with metadata as well as the saved. Two aspects may be noted: firstly that the data part contains N cells where RGB ray data are ordered, and secondly that ray parameters ($x_1$, $x_2$) are not stored. The position of the lines used to parameterize the rays, $z_1$ and $z_2$ are given, other data related to the position of the center of projection $x_3$ and $z_3$ can be derived by identifying a and b with their expression from equation H and then solving for the unknowns.

In the case where the camera cannot be modeled as a pinhole, the format is adapted to a slightly different arrangement which can be considered as a generalization of the one presented in the sub-sections above.

Figure 17:
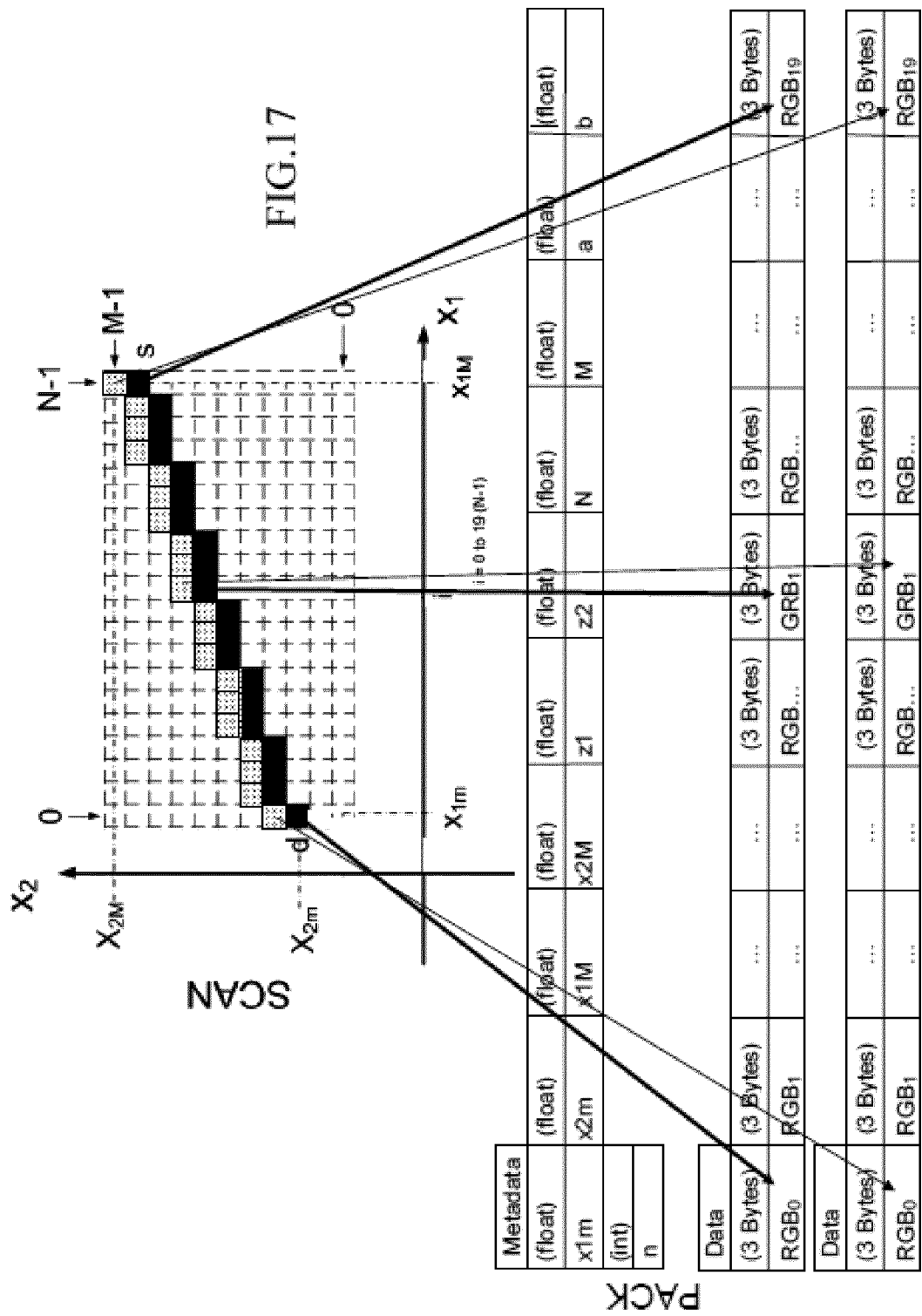

Indeed, it has already been shown that the rays will map along a beam of digital lines and not a unique one. As shown on FIG. 17, the metadata shall contain one supplementary value n which is the number of digital lines that have to be scanned, and the data section of the format packs additional vectors of RGB data for the additional lines.

Again, as done before, now that the 2D example has been used to illustrate the process, it may be generalized to real space, the 4D parameter space. In the 4D ray space, the ray's parameters will map into a 4D cell indexed by 4 natural numbers (i, j, k, l)$\in R^4$. These indexes will range into [0, N−1; 0, M−1; 0, K−1; 0, L−1]. In order to scan the cells which contain data, the digital equivalent of the parametric equation of a hyper-plane may be used:

$$x_{1_i} = x_{1_m} + i\Delta x_1$$

$$x_{2_j} = x_{2_m} + j\Delta x_2$$

$$y_{1_k} = y_{1_m} + k\Delta y_1$$

And then:

$$\exists y_{2_l} | \alpha(x_{1_i} + y_{1_k}) + \beta(x_{2_j} + y_{2_l}) + \gamma = 0$$

From which the last missing index l may be deduced since:

$$y_{2_l} = y_{2_m} + l\Delta y_2$$

Signifying that the scan and pack algorithm in 4D may be given for example by:

```
for each i ∈ [0, N— 1] ⊂ N
  for each j ∈ [0, M - 1] ⊂ N
    for each k ∈ [0, K - 1] ⊂ N
      calculate l ∈ N
        store RGB value of the ray located in cell i, j, k, l
    end for k
  end for j
end for i
```

Table 2 summarizes the type of parameters used In the metadata format with the data section containing here two vectors of RGB data. Two vectors of RGB data are used to illustrate a more general case where rays from the light field map onto more than one hyper plane by assuming n=2 as an example signifying that a pair of digital hyper planes is stored in the format.

TABLE 2

| Format layout for a 4D light field | | | | | | | | | | |
|---|---|---|---|---|---|---|---|---|---|---|
| Metadata | | | | | | | | | | |
| (float) | (float) | (Int) | (float) | (float) | (Int) | (float) | (float) | (float) | (float) | (float) |
| x1m | x1M | N | x2m | x2M | M | z1 | z2 | α | β | γ |
| y1m | y1M | K | y2m | y2M | L | | | | | |
| (int) | | | | | | | | | | |
| n | | | | | | | | | | |
| Data | | | | (p = NxMxK) RGB values | | | | | | |
| (3 Bytes) | (3 Bytes) | | | | | (3 Bytes) | (3 Bytes) | (3 Bytes) | . . . | (3 Bytes) |
| $RGB_0$ | $RGB_1$ | . . . | . . . | | | $RGB_.$ | $RGB_1$ | $RGB_.$ | . . . | $RGB_{0-1}$ |
| Data | | | | (p = NxMxK) RGB values | | | | | | |
| (3 Bytes) | (3 Bytes) | | | | | (3 Bytes) | (3 Bytes) | (3 Bytes) | . . . | (3 Bytes) |
| $RGB_0$ | $RGB_1$ | . . . | . . . | | | $RGB_.$ | $RGB_1$ | $RGB_.$ | . . . | $RGB_{0-1}$ |

The format is used to generate rays. Firstly a 2D case is used for illustrative purposes. Firstly metadata is read. Then the data section is scanned one RGB cell after the other.

Supposing the readout is at call number i, then in order to generate $(x_{1_i}, x_{2_j})$ which are the parameters of the ray that has its RGB values stored at that place, the 3 equations (F) are applied. Reading additional data from the header, it may be included that the ray stored at position i in the data section of the format has its parameters $(x_{1_i}, z_1, x_{2_j}, z_2)$ which are all calculated from the file and which uniquely define that ray.

Figure 12C:
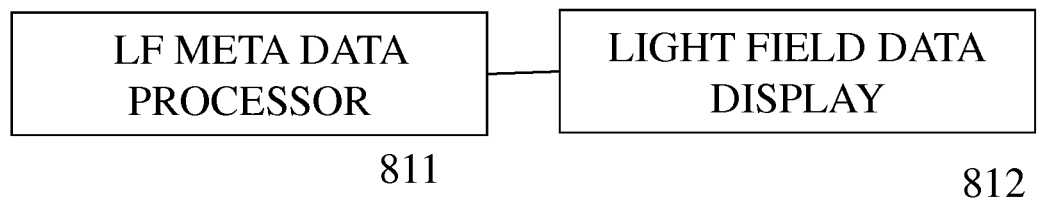
FIG. 12C illustrates a device for rendering at least one image from light field data.

FIG. 12C illustrates a device for rendering at least one image from light field data comprising a processor 811 for processing data obtained in accordance with the method of any embodiment of the invention as hereinbefore described; and a display 812 for rendering an image in accordance with the processed data.

Figure 18B:
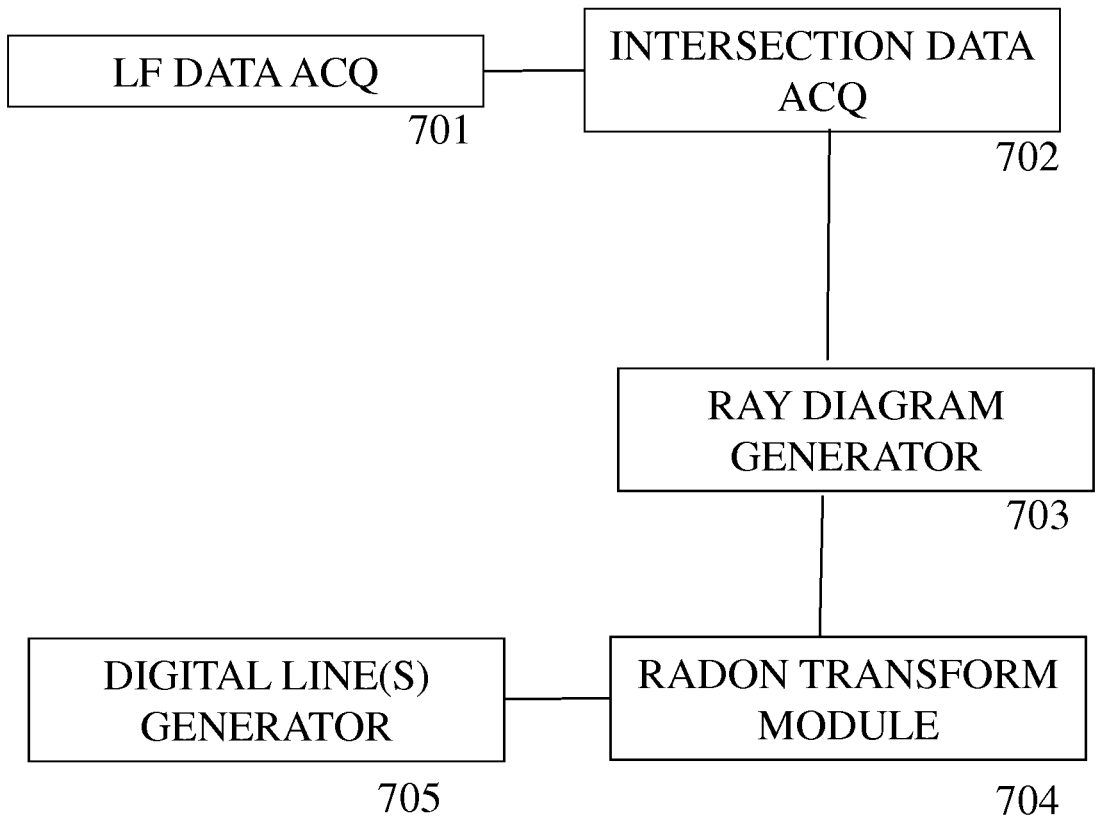
FIG. 18B is a functional block diagram illustrating modules of a device for providing a light data format in accordance with one or more embodiments of the invention.
Figure 18C:
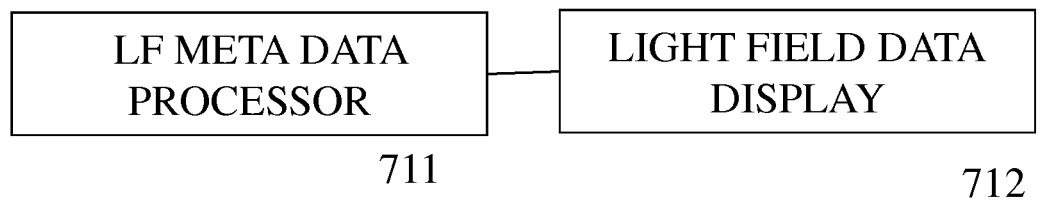
FIG. 18C is a functional block diagram illustrating modules of a display device for in accordance with one or more embodiments of the invention.
Figure 19:
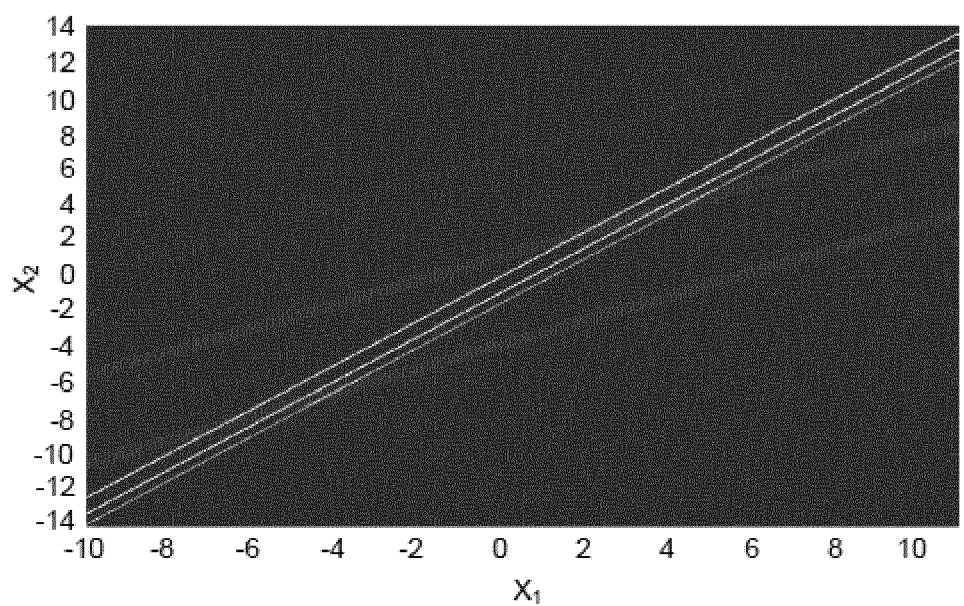
FIG. 19 is a 2D ray diagram graphically illustrating intersection data for a plurality of cameras In accordance with embodiments of the invention

FIG. 18A is a flow chart illustrating the steps of a method for generating data representative of a light field according to one or more embodiments of the invention. FIG. 18B is a block diagram schematically illustrating the main modules of a system for generating data representative of alight field according to one or more embodiments of the invention.

In a preliminary step S701 of the method raw light field data is acquired by a light field camera 701. The raw light field data may for example be in the form of micro images as described with reference to FIG. 3. The light field camera may be a light field camera device such as shown in FIG. 1A or 1B and 2A and 2B.

In step S702 the acquired light field data is processed by ray parameter module 702 to provide intersection data $(x_1, y_1, x_2, y_2)$ defining intersection of captured light field rays with a pair of reference planes for parameterization $P_1$, $P_2$ at respective depths $z_1$, $z_2$.

From this step intersection data $(x_1, y_1, x_2, y_2)$ geometrically defining intersection of light field rays with reference planes $P_1$, $P_2$ is obtained.

In step S703 2D ray a diagram graphically representing the intersection data $(x_1, y_1, x_2, y_2)$ is obtained by ray diagram generator module 703.

It would be interesting to obtain a format for the 4D case which is similar to what was proposed for the 2D case. To do so, it would be interesting to associate the 2D lines found on the $\Pi(x_1, x_2)$, plane with the lines found on the $\Pi(y_1, y_2)$ place, i.e., the lines that are the results of the intersection of the corresponding hyper plane with the two orthogonal slices of $\Pi(x_1, x_2)$, and $\Pi(y_1, y_2)$, From expressions D and E, it is known that the corresponding lines have the same slope m. This is the first parameter that associates each line in $\Pi(x_1, x_2)$ to a line in $\Pi(y_1, y_2)$, for a camera at a certain depth. If there are multiple cameras at the same depth), there are three lines in $\Pi(x_1, x_2)$, and three lines in $\Pi(y_1, y_2)$, with the some estimated slope of m. The correspondences in the line offsets between the lines in these two planes are then determined. To do this, the formulation of the lines in expressions D and E are exploited. In particular, denoting $$k = \frac{z_2 - z_1}{z_3 - z_1},$$

the offsets are as follows:

$$\begin{cases} kx_3 + kA = d_{max_x} \\ kx_3 - kA = d_{min_x} \end{cases} \quad (F)$$

and $$\begin{cases} ky_3 + kA = d_{max_y} \\ ky_3 - kA = d_{min_y} \end{cases} \quad (G)$$

The sets of the equations may be solved for k, $x_3$ and $y_3$. Note that $(x_3, y_3, z_3)$ correspond to the coordinates of the camera, or In other words the voxel where the corresponding bundle of light is focused into a circle of the radius A. We have supposed that the aperture on the plane positioned at $z_3$ is circular, so that $d_{max_x} - d_{min_x} = d_{max_y} - d_{min_y} = 2kA$, and by solving the previous sets of equations:

$$k = \frac{d_{max_x} - d_{min_x}}{2A} \quad (G)$$

$$x_3 = A \frac{d_{max_x} + d_{min_x}}{d_{max_x} - d_{min_x}} \quad (H)$$

The digital lines may be scanned as before on $\Pi(x_1, x_2)$ using the Bresenham digital lines; For each individual $(x_1, x_2)$ value, the corresponding $(y_1, y_2)$ values captured in the light field are stored. To find such values, expression (C) Is exploited. All the following are either known or estimated from expressions (F) and (G) $x_3$; $y_3$; $z_3$; $z_1$; $z_2$ Moving on each line in $\Pi(x_1, x_2)$, for each $(x_1^q, x_2^q)$, the following relationship in $(y_1, y_2)$ is obtained:

$$y_2 = \frac{z_3 - z_2}{z_3 - z_1} y_1 + \frac{z_3 - z_2}{z_3 - z_1} x_1^q + \frac{z_2 - z_1}{z_3 - z_1}(x_3 + y_3^*) - x_2^q$$

or, $$y_2 = my_1 + mx_1^q + k(x_3 + y_3^*) - x_2^q = my_1 + d_{off}(x_1^q, x_2^q, x_3, y_3^*)$$

For each point in $\Pi(x_1, x_2)$, a collection of lines in $\Pi(y_1, y_2)$ is saved. $d_{off}$ corresponds to the offset of the lines scanned and saved for $(x_1^q, x_2^q)$. It is noted that:

$$d_{off}(x_1^q, x_2^q) = mx_1^q + k(x_3 + y_3^*) - x_2^q$$

With reference to FIG. 11 each square is a $(x_1^q, x_2^q)$, point, and for each one of these points, there is a set of Bresenham digital lines running out of the plane of the figure along a digital bundle defined by equation:

$$y_2 = my_1 + d_{off}(x_1^q, x_2^q, x_3, y_3^*) \quad (K)$$

perpendicular to the depicted datalines, but in a 4D space. Here, $y^*_3$ varies between $y_3 - A$ to $y_3 + A$.

An exemplary data format for a bundle of data lines per camera is Illustrated in Table 2.

TABLE 2

| Tags | | | Data | | | |
|---|---|---|---|---|---|---|
| Parametrization plane offset $z_2$-$z_3$ ($z_3$ is relative to $z_1$) float | | | $\Delta z$ | | | |
| Width in number of $x_1$ cells (integer) | min $x_1$ value (float) | max $x_1$ value (float) | N | $x_1$min | $x_1$max | |
| Width in number of $x_2$ cells (integer) | min $x_2$ value (float) | max $x_2$ value (float) | M | $x_2$min | $x_2$max | |
| Width in number of $y_1$ cells (integer) | min $y_1$ value (float) | max $y_1$ value (float) | P | $y_1$min | $y_1$max | |
| Width in number of $y_2$ cells (integer) | min $y_2$ value (float) | max $y_2$ value (float) | Q | $y_2$min | $y_2$max | |
| Number of cameras (integer) | | | n | | | |
| Aperture size for $cam_1$ | | | $A_1$ | | | |
| $Cam_1$ focus (3 floats) | | | $x3_1$ | $y3_1$ | $z3_1$ | |
| lowest $cam_1$ intercept in $(x_1, x_2)$ | $cam_1$ steepness | $cam_1$ number of digital lines in $x_1, x_2$ | $d_1$ | $m_1$ | $lx_1$ | |
| | | $cam_1$ number of digital lines in $y_1, y_2$ | | | $ly_1$ | |
| data line ($end_1 \equiv |x_1*N*|y_1*P)* 3$ bytes | | | $RGB_0$ | $RGB_1$ | ... | $RGB_{end1}$ |
| ... | | | ... | ... | | |
| ... | | | ... | ... | ... | ... |
| Aperture size for $cam_0$ | | | $A_1$ | | | |
| $Cam_0$ focus (3 floats) | | | $x3_1$ | $y3_1$ | $z3_1$ | |
| lowest $cam_0$ intercept in $(x_1, x_2)$ | $cam_0$ steepness | $cam_0$ number of digital lines in $x_1, x_2$ | $d_n$ | $m_n$ | $lx_0$ | |
| | | $Cam_0$ number of digital lines in $y_1, y_2$ | | | $ly_n$ | |
| data line ($end_{11} \equiv |x_{11}*N*|y_0*P)* 3$ bytes | | | $RGB_1$ | $RGB_2$ | ... | $RGB_{end0}$ |

-continued $$y_3 = A \frac{d_{max_y} + d_{min_y}}{d_{max_y} - d_{min_y}} \quad (I)$$

$$z_3 = \frac{z_2 + (k-1)z_1}{k} \quad (J)$$

Firstly general metadata of the 4D space is provided: Including boundaries of the 4 axes $x_1, x_2, y_1, y_2$ and their corresponding sampling. The number of cameras (bundles) Is also provided. For each camera j the following parameters are saved:

the size of the aperture: $A_j$,
the focus point of the camera: $cam_j$ focusPoint $(x_3, y_3, z_3)$
lowest d intercept in $(x1_x, 2) = d_i$
steepness = $m_j$ number of digital lines in $(x_1, x_2) = l_j^x$
number of digital lines in $(y_1, y_2) = l_j^y$ On each camera, for each $(x^q_1; x^q_2)$, scanning is started on $(y_1, y_2)$ with respect to expression (K) using the Bresenham digital lines, and the RGB values are saved. $y^*_3$ varies between $y_3-A$ to $y_3+A$ and the corresponding $d_{off}$ is calculated according to expression (K).

The same calculations are performed In the decoding step using the stored metadata. In particular, k is found using equation (H). Hence the format remains compact. There is no need to store four indexes for each ray in the system. It is noted that the sampling of the hyper-plane above is the sampling of the 4D ray-space and thus a single $x_1; y_1; x_2; y_2$ location is not missed. This is only one example of a systematic scanning of the 4D ray-space for saving al data In a very compact form. Other processes may of course be applied. The parametric form seems to be adapted to explore the hyper-plane because it permits an inter-leaved space exploration.

In the case of multiple cameras to work on data that contains several bundles of hyper-planes (several maxima in the Radon transform due to multiple cameras), a more complex algorithm may be used. As a pre-processing step, the parameters (m, k) are found for all the peaks in the radon transform of $\Pi(x_1, x_2)$, and put in one set. The same is done for the peaks in $(y_1, y_2)$ and the parameters are put in another set. Now in each iteration of the greedy algorithm, the maximum peak intensity is found in the 2D radon transform of $(x_1, x_2)$ and the corresponding peak in $(y_1, y_2)$ is found by matching the previously found parameters (m, k). After saving the data as mentioned in the last section, these peaks are cleaned from the radon transforms, and the next iteration is started, until nothing meaningful remains in the light field FIG. 13C illustrates a device for rendering at least one image from light field data comprising a processor 711 for processing data obtained in accordance with the method of any embodiment of the invention as hereinbefore described; and a display for rendering an image In accordance with the processed data Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

The invention claimed is:

1. A computer implemented method for generating data representative of a light field, the method comprising:
   obtaining intersection data defining intersections of light field rays from a scene with a plurality of given reference planes, said reference planes corresponding to different depths in the scene, each set of intersection data corresponding to a light field ray having a color value;
   determining, one or more data hyper-planes representing the intersection data in a parameter space of sampling cells;
   scanning data on or around the data hyper-planes by means of parametric equations to sample data representative of the light field ray
   providing a data format representative of the light field including at least one data parameter defining the at least one data hyper plane in the parameter space and the color value associated with each light field ray.

2. A method according to claim 1, wherein the one or more data hyper-planes are determined by discrete radon transformation.

3. A method according to claim 2, wherein two orthogonal discrete radon transforms are applied in the parameter space to obtain the one or more data hyper planes.

4. A method according to claim 1 wherein the one or more data hyper-planes are determined from data defining camera acquisition parameters.

5. A method according to claim 1 wherein the data parameters defining the at least one data hyper-plane include data representative of at least one of:
   minimum value of intersection data of a first reference plane;
   maximum value of intersection data of the first reference plane;
   minimum value of intersection data of a second reference plane;
   maximum value of intersection data of the second reference plane;
   the number of sampling cells defining the parameter space;
   the position of the first reference plane; or
   the position of the second reference plane.

6. A method according to claim 5 wherein each data hyper-plane is defined by a plurality of cells of the parameter space, at least one first cell representative of the interception of the line with an axis and at least one second cell from which a slope of the line may be determined.

7. A method according to claim 6 wherein each data hyper-plane is generated by application of Bresenham's algorithm.

8. A method according to claim 7 wherein a beam of rays is represented as a plurality of hyper-planes having the same slope and different axis interception points.

9. A method according to claim 8 wherein the data representative of the acquired light field data comprises data representative of the thickness of the beam based on upper and lower boundaries of the axis interception data of lines of the beam.

10. A method for generating light field rays from light field data provided according to the method of claim 1 comprising
    reading meta data defining the at least one data parameter defining that least one at a hyper-plane and reading color data cell by cell.

11. A device for providing metadata for captured light field data, the device comprising
    at least one processor configured to
    acquire light field data captured by a light field camera;
    obtain intersection data defining intersections of light field rays from a scene with a plurality of given reference planes, said reference planes corresponding to different depths in the scene, each set of intersection data corresponding to a light field ray having a color value;
    determine, one or more data hyper-planes representing the intersection data in a parameter space of sampling cells;
    scan data on or around the data hyper-planes by means of parametric equations to sample data representative of the light field ray; and
    provide a data format representative of the light field including at least one data parameter defining the hyper-plane in the parameter space and the color value associated with each generated light field ray.

12. A device according to claim 11, wherein the at least one processor is further configured to determine the one or more data hyper-planes by discrete radon transformation.

13. A device according to claim 12, wherein the at least one processor is further configured to apply two orthogonal discrete radon transforms in the parameter space to obtain the one or more data hyper planes.

14. A device according to claim 11, wherein the at least one processor is further configured to determine the one or more data hyper-planes from data defining camera acquisition parameters.

15. A device according to claim 11, wherein the data parameters defining the at least one data hyper-plane include data representative of at least one of:
- minimum value of intersection data of a first reference plane;
- maximum value of intersection data of the first reference plane;
- minimum value of intersection data of a second reference plane;
- maximum value of intersection data of the second reference plane;
- the number of sampling cells defining the parameter space;
- the position of the first reference plane; or
- the position of the second reference plane.

16. A device according to claim 15, wherein each data hyper-plane is defined by a plurality of cells of the parameter space, at least one first cell representative of the interception of the line with an axis and at least one second cell from which the slope of the line may be determined.

17. A device according to claim 16, wherein the at least one processor is further configured to generate each digital hyper-plane by application of Bresenham's algorithm.

18. A device according to claim 17, wherein a beam of rays is represented as a plurality of hyper-planes having the same slope and different axis interception points.

19. A device according to claim 18, wherein the data representative of the acquired light field data comprises data representative of the thickness of the beam based on upper and lower boundaries of the axis interception data of lines of the beam.

20. A light field imaging device comprising:
- an array of micro lenses arranged in a regular lattice structure;
- a photosensor configured to capture light projected on the photosensor from the array of micro lenses, the photosensor comprising sets of pixels, each set of pixels being optically associated with a respective micro lens of the array of micro lenses; and
- a device for providing metadata in accordance with claim 11.

21. A device for rendering an image from light field data obtained using a method in accordance with claim 1.

22. A non-transitory computer-readable medium storing executable program instructions to cause a processor executing the instructions to perform the method of claim 1.

* * * * *